US012422565B2

(12) United States Patent
Su

(10) Patent No.: US 12,422,565 B2
(45) Date of Patent: Sep. 23, 2025

(54) VEHICLE POSITIONING USING PSEUDO RANGE OBSERVATION AND DOPPLER OBSERVATION VALUES

(71) Applicant: Tencent Technology (Shenzhen) Company Limited, Guangdong (CN)

(72) Inventor: Jinglan Su, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 323 days.

(21) Appl. No.: 17/988,009

(22) Filed: Nov. 16, 2022

(65) Prior Publication Data

US 2023/0072669 A1 Mar. 9, 2023

Related U.S. Application Data

(63) Continuation of application No. PCT/CN2022/076131, filed on Feb. 14, 2022.

(30) Foreign Application Priority Data

Feb. 22, 2021 (CN) .......................... 202110196837.8

(51) Int. Cl.
*G01S 19/40* (2010.01)
*G01S 19/25* (2010.01)
(Continued)

(52) U.S. Cl.
CPC .......... *G01S 19/396* (2019.08); *G01S 19/254* (2013.01); *G01S 19/258* (2013.01); *G01S 19/40* (2013.01);
(Continued)

(58) Field of Classification Search
CPC ...... G01S 19/396; G01S 19/393; G01S 19/05; G01S 19/254; G01S 19/258; G01S 19/40;
(Continued)

(56) References Cited

U.S. PATENT DOCUMENTS 7,133,772 B2 * 11/2006 van Diggelen ........... G01S 5/12
342/357.42
7,987,048 B2 * 7/2011 van Diggelen ......... G01S 19/09
701/477
(Continued)

FOREIGN PATENT DOCUMENTS

CN 105372685 A 3/2016
CN 108562917 A 9/2018
(Continued)

OTHER PUBLICATIONS

International Search Report and Written Opinion in PCT/CN2022/076131, mailed May 18, 2022, 13 pages.

*Primary Examiner* — Chuong P Nguyen
(74) *Attorney, Agent, or Firm* — ARENTFOX SCHIFF LLP

(57) ABSTRACT

A vehicle positioning method includes obtaining satellite filtering parameters and satellite data, the satellite data comprising at least one of (i) a pseudo range observation value or (ii) a Doppler observation value indicating a Doppler effect. The method further includes determining a first parameter correction amount corresponding to the vehicle at a first time point to obtain positioning information of the vehicle at the first time point. The method further includes determining a second parameter correction amount corresponding to the vehicle at the second time point according to a constraint matrix corresponding to the motion state of the vehicle, and obtaining positioning information of the vehicle at the second time point by modifying the positioning information at the first time point using the second parameter correction amount.

20 Claims, 8 Drawing Sheets

(51) Int. Cl.
   *G01S 19/39* (2010.01)
   *G01S 19/41* (2010.01)
   *G01S 19/42* (2010.01)
   *G01S 19/45* (2010.01)
(52) U.S. Cl.
   CPC ............... *G01S 19/41* (2013.01); *G01S 19/42* (2013.01); *G01S 19/45* (2013.01)
(58) Field of Classification Search
   CPC .......... G01S 19/41; G01S 19/42; G01S 19/45; G01S 5/017
   USPC ............ 342/357.23, 357.24, 357.25, 357.28, 342/357.42, 357.64
   See application file for complete search history.

(56) References Cited

U.S. PATENT DOCUMENTS

| | | | | |
|---|---|---|---|---|
| 8,094,066 B2 * | 1/2012 | Mizuochi | ................ | G01S 19/52 342/357.28 |
| 10,866,326 B2 * | 12/2020 | Matsue | ................... | G01S 19/40 |
| 2004/0239558 A1 * | 12/2004 | Geier | ...................... | G01S 19/42 342/357.64 |
| 2006/0111840 A1 | 5/2006 | Van Diggelen | | |
| 2023/0053952 A1 * | 2/2023 | Su | .............................. | G06T 5/50 |
| 2023/0258826 A1 * | 8/2023 | Kitano | ................... | G01S 19/49 701/408 |
| 2024/0142639 A1 * | 5/2024 | Su | ........................... | G01S 19/40 |
| 2024/0272307 A1 * | 8/2024 | Su | ........................... | G01S 19/37 |
| 2024/0280679 A1 * | 8/2024 | Su | ........................... | G01S 17/06 |

FOREIGN PATENT DOCUMENTS

| | | | | | |
|---|---|---|---|---|---|
| CN | 109855617 A | * | 6/2019 | ............ | G01S 21/16 |
| CN | 110865405 A | * | 3/2020 | ............ | G06F 18/25 |
| CN | 112505735 A | * | 3/2021 | ........... | G01S 19/396 |
| CN | 112558125 A | | 3/2021 | | |
| CN | 112255648 B | * | 3/2022 | ............ | G01S 19/19 |
| CN | 111522044 B | * | 2/2023 | ............ | G01C 21/28 |
| JP | 2007248271 A | | 9/2007 | | |

* cited by examiner

VEHICLE POSITIONING USING PSEUDO RANGE OBSERVATION AND DOPPLER OBSERVATION VALUES

RELATED APPLICATIONS

This application is a continuation of International Application No. PCT/CN2022/076131, entitled "METHOD FOR VEHICLE POSITIONING, RELATED APPARATUS, DEVICE, AND STORAGE MEDIUM," filed on Feb. 14, 2022, which claims priority to Chinese Patent Application No. 202110196837.8, entitled "VEHICLE POSITIONING METHOD, RELATED APPARATUS, DEVICE AND STORAGE MEDIUM", filed on Feb. 22, 2021. The entire disclosures of the prior applications are hereby incorporated by reference.

FIELD OF THE TECHNOLOGY

This application relates to the technical field of positioning and navigation, including vehicle positioning.

BACKGROUND OF THE DISCLOSURE

With the rapid development of autonomous driving and driver-assistance technologies, positioning is particularly important as a technology for vehicle self-positioning. In advanced driver assistance and autonomous driving systems, high-precision positioning determines the location of the vehicle's geographic information, which is a key part of ensuring the safety of advanced driver assistance and even autonomous driving.

At present, the related art provides a method for suppressing data drift of an in-vehicle positioning apparatus, which determines whether to discard positioning data obtained by the in-vehicle positioning apparatus according to whether the in-vehicle positioning apparatus is turned on or the cold start time reaches a set value, and in a case that the vehicle is driving, whether to discard the positioning data obtained by the in-vehicle positioning apparatus is determined according to the speed of the vehicle.

The method above utilizes global positioning system (GPS) positioning to determine a stationary or motion state of the vehicle. In a case that the vehicle is in the stationary state, state constraint is carried out according to historical positioning data, otherwise the normal positioning process is carried out.

SUMMARY

Embodiments of this disclosure provide a vehicle positioning method, a related apparatus, a device, and a storage medium. Pseudo range observation values and Doppler observation values determined based on satellite ephemeris have higher reliability. Therefore, using the pseudo range observation values and the Doppler observation values to assist in satellite positioning may enhance the accuracy of satellite positioning in weak satellite signal scenarios, thereby improving the accuracy of vehicle positioning information.

In an embodiment, a vehicle positioning method includes obtaining satellite filtering parameters and satellite data, the satellite filtering parameters including a clock skew and a clock skew change rate. The satellite filtering parameters further include at least one of location information or speed information corresponding to a vehicle at a first time point, and the satellite data includes at least one of (i) a pseudo range observation value indicating a distance between the vehicle and a satellite or (ii) a Doppler observation value indicating a Doppler effect of a signal of the satellite. The pseudo range observation value and the Doppler observation value correspond to the vehicle at the first time point. The method further includes determining a first parameter correction amount corresponding to the vehicle at the first time point according to the satellite filtering parameters and the satellite data, and updating the satellite filtering parameters by using the first parameter correction amount, to obtain positioning information of the vehicle at the first time point. The method further includes obtaining a motion state of the vehicle at a second time point after the first time point, and obtaining a constraint matrix corresponding to the motion state when the motion state of the vehicle at the second time point satisfies a positioning correction condition, the constraint matrix representing a positioning information variation corresponding to the motion state. The method further includes determining a second parameter correction amount corresponding to the vehicle at the second time point according to the constraint matrix corresponding to the motion state, and obtaining positioning information of the vehicle at the second time point by modifying the positioning information at the first time point using the second parameter correction amount.

In an embodiment, a vehicle positioning apparatus includes processing circuitry configured to obtain satellite filtering parameters and satellite data, the satellite filtering parameters including a clock skew and a clock skew change rate. The satellite filtering parameters further include at least one of location information or speed information corresponding to a vehicle at a first time point, and the satellite data includes at least one of (i) a pseudo range observation value indicating a distance between the vehicle and a satellite or (ii) a Doppler observation value indicating a Doppler effect of a signal of the satellite. The pseudo range observation value and the Doppler observation value correspond to the vehicle at the first time point. The processing circuitry is further configured to determine a first parameter correction amount corresponding to the vehicle at the first time point according to the satellite filtering parameters and the satellite data, and update the satellite filtering parameters by using the first parameter correction amount, to obtain positioning information of the vehicle at the first time point. The processing circuitry is further configured to obtain a motion state of the vehicle at a second time point after the first time point, and obtain a constraint matrix corresponding to the motion state when the motion state of the vehicle at the second time point satisfies a positioning correction condition, the constraint matrix representing a positioning information variation corresponding to the motion state. The processing circuitry is further configured to determine a second parameter correction amount corresponding to the vehicle at the second time point according to the constraint matrix corresponding to the motion state, and obtain positioning information of the vehicle at the second time point by modifying the positioning information at the first time point using the second parameter correction amount.

In an embodiment, a non-transitory computer-readable storage medium stores computer-readable instructions thereon, which, when executed by a computer device, cause the computer device to perform a vehicle positioning method. The vehicle positioning method includes obtaining satellite filtering parameters and satellite data, the satellite filtering parameters including a clock skew and a clock skew change rate. The satellite filtering parameters further include at least one of location information or speed information corresponding to a vehicle at a first time point, and the satellite data includes at least one of (i) a pseudo range observation value indicating a distance between the vehicle and a satellite or (ii) a Doppler observation value indicating a Doppler effect of a signal of the satellite. The pseudo range observation value and the Doppler observation value correspond to the vehicle at the first time point. The method further includes determining a first parameter correction amount corresponding to the vehicle at the first time point according to the satellite filtering parameters and the satellite data, and updating the satellite filtering parameters by using the first parameter correction amount, to obtain positioning information of the vehicle at the first time point. The method further includes obtaining a motion state of the vehicle at a second time point after the first time point, and obtaining a constraint matrix corresponding to the motion state when the motion state of the vehicle at the second time point satisfies a positioning correction condition, the constraint matrix representing a positioning information variation corresponding to the motion state. The method further includes determining a second parameter correction amount corresponding to the vehicle at the second time point according to the constraint matrix corresponding to the motion state, and obtaining positioning information of the vehicle at the second time point by modifying the positioning information at the first time point using the second parameter correction amount.

In the embodiments of this disclosure, provided is a vehicle positioning method. First, satellite filtering parameters and to-be-processed satellite data are obtained, the satellite filtering parameters include a clock skew and a clock skew change rate, and the satellite filtering parameters further include at least one of location information and speed information corresponding to a target vehicle at a first moment, and the to-be-processed data includes at least one of a pseudo range observation value and a Doppler observation value corresponding to the target vehicle at the first moment; and then a first parameter correction amount corresponding to the target vehicle at the first moment is determined according to the satellite filtering parameters and the to-be-processed data. On this basis, the satellite filtering parameters may be updated by using the first parameter correction amount, to obtain positioning information of the target vehicle at the first moment. A motion state of the target vehicle at a second moment is obtained, where the second moment is a moment after the first moment. If the motion state of the target vehicle at the second moment satisfies a positioning correction condition, a constraint matrix corresponding to the motion state is obtained, then a second parameter correction amount corresponding to the target vehicle at the second moment is determined according to the constraint matrix corresponding to the motion state, and finally, the positioning information at the first moment is updated by using the second parameter correction amount, to obtain positioning information of the target vehicle at the second moment. Through the manner above, in a case that the vehicle is in a weak satellite signal scenario, the positioning information of the vehicle may be corrected by using at least one of the pseudo range observation value and the Doppler observation value. The pseudo range observation value and the Doppler observation value determined based on satellite ephemeris have higher reliability. Therefore, using the pseudo range observation value and the Doppler observation value to assist in satellite positioning may enhance the reliability of satellite positioning in weak satellite signal scenarios, thereby improving the accuracy of vehicle positioning information. Furthermore, constraints are then constructed based on the vehicle motion state, which may better improve the positioning accuracy.

DESCRIPTION OF EMBODIMENTS

The embodiments of this disclosure provide a vehicle positioning method, a related apparatus, a device, and a storage medium. Pseudo range observation values and Doppler observation values determined based on satellite ephemeris have higher reliability. Therefore, using the pseudo range observation values and the Doppler observation values to assist in satellite positioning may enhance the accuracy of satellite positioning in weak satellite signal scenarios, thereby improving the accuracy of vehicle positioning information.

The terms such as "first", "second", "third", and "fourth" (if any) in the specification and claims of this disclosure and in the accompanying drawings are used for distinguishing similar objects and not necessarily used for describing any particular order or sequence. It is to be understood that data used in this way is exchangeable in a proper case, so that the embodiments of the present disclosure described herein can be implemented in an order different from the order shown or described herein. Moreover, the terms "include", "corresponding to", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

With the progress of society and the development of science and technology, positioning technology achieves a qualitative leap in technical means, positioning accuracy, usability and other aspects, and has gradually penetrated into all aspects of social life from the fields of navigation, aerospace, aviation, surveying and mapping, military and natural disaster prevention, and has become an indispensable and important application in people's daily life, such as personnel search, location search, traffic management, vehicle navigation and route planning, among which the Global Navigation Satellite System (GNSS) plays an important role in the above scenarios. However, the positioning coordinates of the terminal device are prone to change, sometimes with large changes, and may even display errors. This phenomenon is the so-called "positioning drift". In places with dense tall buildings or bad weather conditions, signal errors and positioning drift may occur due to multiple reflections and reflections of signals. In a case that the situation of positioning drift cannot be well solved, the promotion and use of positioning applications may be limited to a certain extent.

Figure 1:
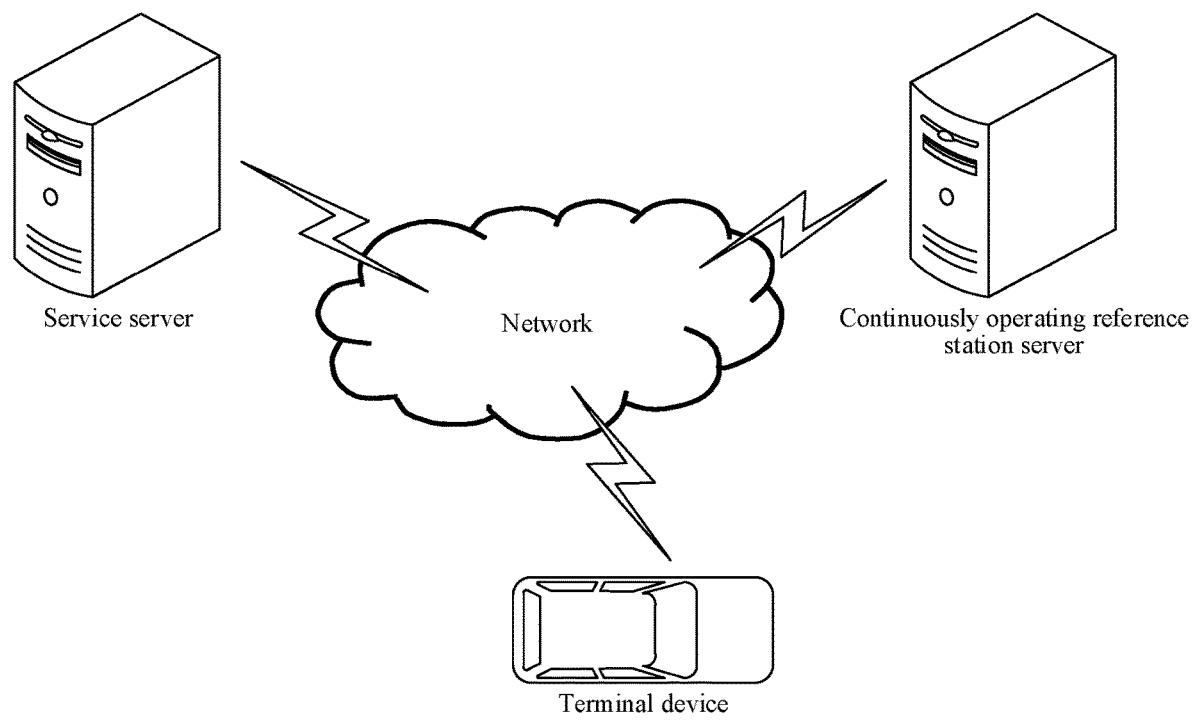
FIG. 1 is a schematic architectural diagram of a vehicle positioning system according to an embodiment of this disclosure.

To reduce the impact of positioning drift on vehicle positioning, embodiments of this disclosure provide a vehicle positioning method. The method is applied to the vehicle positioning system as shown in FIG. 1. As shown in the figure, the vehicle positioning system includes a Continuously Operating Reference Stations (CORS) server, a service server and a terminal device, and the client is deployed on the terminal device. Specifically, the service server may be a navigation service server, and correspondingly, the client may be a navigation application. The service server involved in this disclosure may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be an in-vehicle terminal, a smartphone, a tablet computer, a notebook computer, a palmtop computer, a personal computer, a smart TV, a smartwatch and the like, but is not limited thereto. The terminal device and the server may be directly or indirectly connected in a wired or wireless communication manner. This is not limited in this disclosure. The number of servers and terminal devices is also not limited.

The CORS server consists of four parts, namely a reference station part, a data center part, a data communication part and a user application part. The parts form a private network that is distributed throughout the city.

The reference station part consists of evenly distributed base stations within a control area. The base station is composed of a GNSS, a computer, a meteorological device, a communication device, a power device, and an observation site, etc., and has the ability to continuously track and record satellite signals for a long time. It is a data source of the CORS, and its main functions are the acquisition, tracking, recording and transmission of satellite signals, and device integrity monitoring, etc. The GNSS is a space-based radio navigation and positioning system that may provide users with all-weather three-dimensional coordinates, speed and time information at any place on the Earth's surface or near-Earth space.

The data center part is composed of a computer, a network and a software system. The data center part includes a system control center and a user data center. The system control center is a nerve center of the CORS, which may continuously perform overall modeling and calculation in an area according to real-time observation data acquired by each base station 24 hours a day, and provides code phase and carrier phase difference correction information in an international common format to users who need measurement and navigation through the existing data communication network and wireless data broadcasting network, so as to calculate the precise point position of a moving station in real time. The user data center provides a downlink of a CORS service, and transmits a data result of the control center to the user.

The data communication part is composed of a public or private communication network, including a data transmission hardware device and software control modules. The main function of the data communication part is to transmit the GNSS observation data of the base station to the system control center, and to transmit system differential information to the user, etc.

The user application part is composed of a receiver, a demodulator of wireless communication and a related device. The main function of the user application part is to perform different precision positioning according to user needs.

Figure 2:
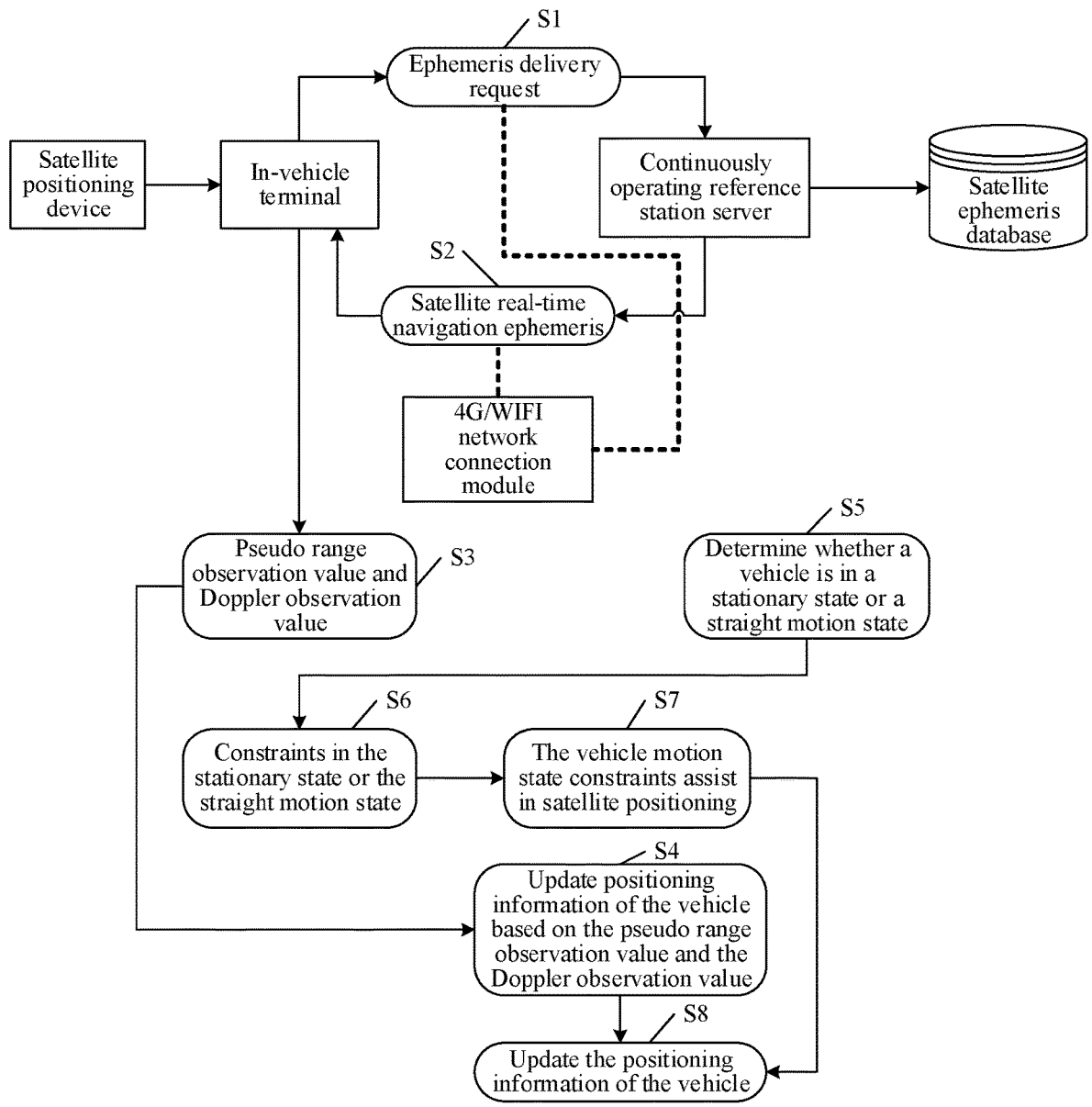
FIG. 2 is a schematic interaction flowchart of a vehicle positioning method according to an embodiment of this disclosure.

For the convenience of description, a method for determining vehicle positioning provided by this disclosure may be introduced below with reference to FIG. 2. FIG. 2 is a schematic interaction flowchart of a vehicle positioning method according to an embodiment of this disclosure. As shown in the figure, specifically:

In step S1, an in-vehicle terminal transmits an ephemeris delivery request to a CORS server.

In step S2, the CORS server transmits broadcast ephemeris information to the in-vehicle terminal, that is, the in-vehicle terminal receives a satellite real-time navigation ephemeris broadcast by the CORS base station server.

In step S3, the in-vehicle terminal obtains a pseudo range observation value and a Doppler observation value through a satellite positioning device.

In step S4, the in-vehicle terminal updates positioning information of a vehicle by using at least one of the pseudo range observation value and the Doppler observation value, the positioning information including location and speed of the vehicle.

In step S5, the in-vehicle terminal determines whether the vehicle is in a stationary state or a straight motion state (driving straight state) based on information such as the vehicle's steering wheel, odometer, camera, or road network matching.

In step S6, in a case that the vehicle is in the stationary or straight motion state, the in-vehicle terminal constructs vehicle motion state constraints.

In step S7, the in-vehicle terminal assists in satellite positioning by using the vehicle motion state constraints.

In step S8, the in-vehicle terminal updates the positioning information of the vehicle.

Based on the foregoing introduction, the vehicle positioning method of this disclosure may implement autonomous driving or auxiliary driving in combination with autonomous driving technology. The autonomous driving technology usually includes high-precision maps, environment perception, behavior decision-making, path planning, motion control, and other technologies. Self-determined driving technology has a wide range of application prospects.

The autonomous driving technology is a branch of an artificial intelligence (AI) technology. AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer science. AI attempts to understand the essence of intelligence and produce a new kind of intelligent machine that can react in a similar way to human intelligence. AI is to study the design principles and implementation methods of various intelligent machines, so that the machines have the functions of perception, reasoning and decision-making.

AI technology is a comprehensive discipline, covering a wide range of fields, including both hardware-level technology and software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and ML/DL.

Figure 3:
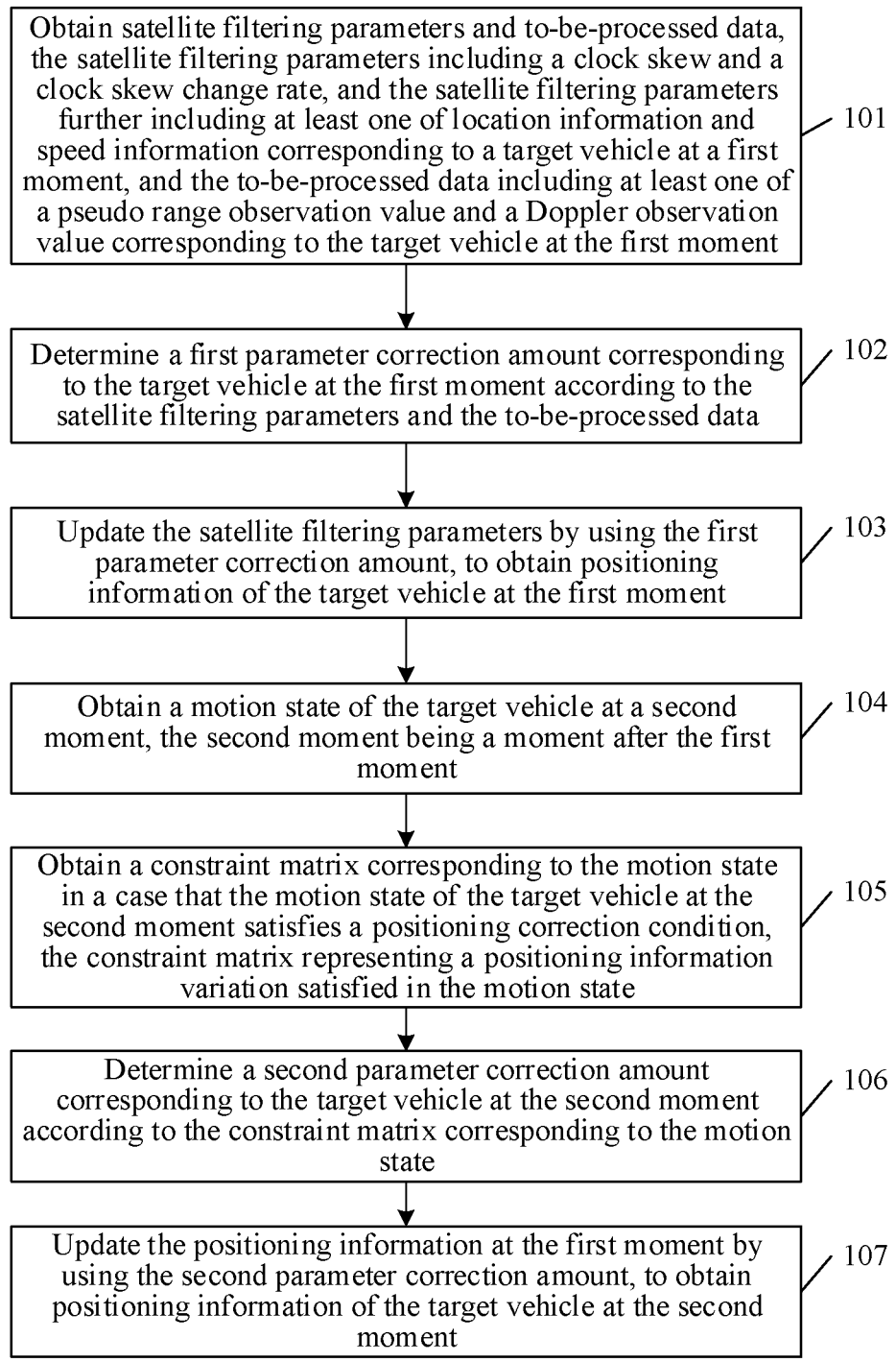
FIG. 3 is a schematic embodiment diagram of a vehicle positioning method according to an embodiment of this disclosure.

The vehicle positioning method in this disclosure is introduced below with reference to the foregoing introduction. Referring to FIG. 3, an embodiment of the vehicle positioning method in the embodiments of this disclosure includes the following steps:

101: A terminal device obtains satellite filtering parameters and to-be-processed data, the satellite filtering parameters including a clock skew and a clock skew change rate, and the satellite filtering parameters further including at least one of location information and speed information corresponding to a target vehicle at a first moment; and the to-be-processed data including at least one of a pseudo range observation value and a Doppler observation value corresponding to the target vehicle at the first moment. For example, satellite filtering parameters and satellite data are obtained, the satellite filtering parameters include a clock skew and a clock skew change rate, the satellite filtering parameters further include at least one of location information or speed information corresponding to a vehicle at a first time point. The satellite data includes at least one of (i) a pseudo range observation value indicating a distance between the vehicle and a satellite or (ii) a Doppler observation value indicating a Doppler effect of a signal of the satellite. The pseudo range observation value and the Doppler observation value correspond to the vehicle at the first time point.

In this embodiment, the terminal device (e.g., the in-vehicle terminal of the target vehicle) obtains the satellite filtering parameters at the first moment, the satellite filtering parameters including the clock skew and the clock skew change rate corresponding to the first moment, and may also include at least one of the location information and speed information corresponding to the target vehicle at the first moment. The first moment represents a current moment, and the target vehicle represents a to-be-positioned vehicle. The clock skew represents a difference between the time indicated by a clock under a certain time system and the standard time of the system, e.g., a difference between a GPS receiver's clock reading and the GPS standard time at a certain moment. The clock skew change rate represents a change in the clock skew of the satellite positioning device.

The terminal device obtains to-be-processed data at the first moment, and the to-be-processed data includes at least one of a pseudo range observation value and a Doppler observation value corresponding to the target vehicle at the first moment. The pseudo range observation value represents a difference between a local receiving moment of a signal and a characterization time value carried by the signal. The Doppler observation value represents an average speed during two adjacent observation time intervals.

Figure 5:
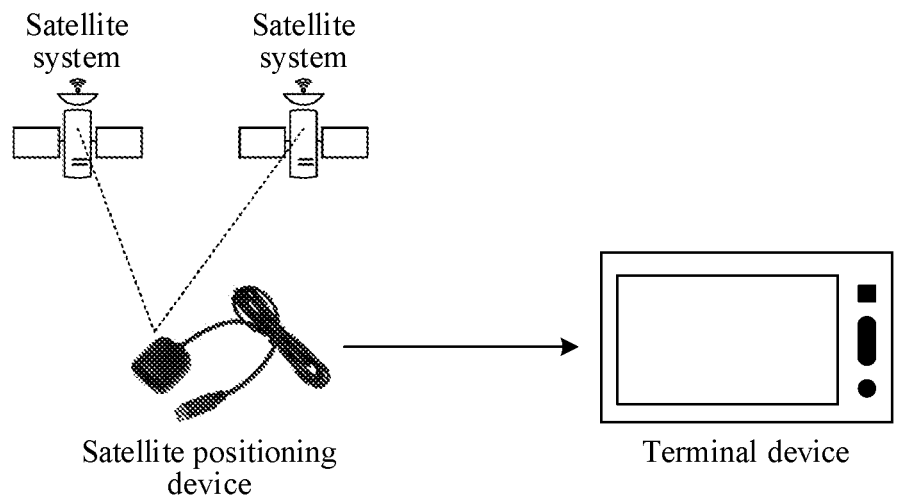
FIG. 5 is a schematic architectural diagram of an in-vehicle positioning system according to an embodiment of this disclosure.

Specifically, the terminal device provided by this disclosure may be applied to an in-vehicle positioning system as shown in FIG. 5. For convenience of understanding, reference is made to FIG. 5. FIG. 5 is a schematic architectural diagram of an in-vehicle positioning system according to an embodiment of this disclosure. As shown in the figure, the in-vehicle positioning system includes a satellite system, connecting lines, a satellite positioning device and a terminal device. The satellite system includes but is not limited to four major satellite navigation systems, namely, U.S.'s GPS, China's BeiDou Navigation Satellite System (BDS), Russia's GLONASS and Europe's GALILEO. With the opening of comprehensive services of BDS and GLONASS in the Asia-Pacific region in recent years, the development of BDS in the civilian field is getting faster and faster. Satellite navigation systems have been widely used in aviation, navigation, communications, personnel tracking, consumer entertainment, surveying and mapping, timing, vehicle monitoring and management, and automobile navigation and information services, and the general development trend is to provide high-precision services for real-time applications.

The satellite positioning device used in this disclosure may be a consumer-grade satellite positioning device, and the consumer-grade satellite positioning device is configured to provide to-be-processed data for a terminal device. The terminal device may be an in-vehicle terminal or a computer. The connecting line may be a Universal Serial Bus (USB) or a High Definition Multimedia Interface (HDMI) connecting line, and the connecting line is mainly configured to connect the satellite positioning device and the terminal device.

It is to be illustrated that the terminal device involved in this disclosure may be an in-vehicle terminal, a smart phone, or other types of computers, which are not limited here.

102: The terminal device determines a first parameter correction amount corresponding to the target vehicle at the first moment (first time point) according to the satellite filtering parameters and the to-be-processed data (satellite data).

In this embodiment, the terminal device calculates a first parameter correction amount corresponding to the target vehicle at the first moment according to the satellite filtering parameters corresponding to the first moment and the to-be-processed data.

103: The terminal device updates the satellite filtering parameters by using the first parameter correction amount, to obtain positioning information of the target vehicle at the first moment. For example, positioning information of the vehicle at the first time point is obtained by correcting the satellite filtering parameters using the first parameter correction amount.

In this embodiment, the terminal device updates the satellite filtering parameters by using the first parameter correction amount, that is, the terminal device may obtain positioning information of the target vehicle at the first moment in adding the first parameter correction amount and the satellite filtering parameters. It is to be illustrated that in a case that the satellite filtering parameters include the location information, the positioning information includes updated location information. In a case that the satellite filtering parameters include the speed information, the positioning information includes updated speed information. In a case that the satellite filtering parameters include the speed information and the location information, the positioning information includes updated speed information and updated location information.

104: The terminal device obtains a motion state of the target vehicle at a second moment, the second moment being a moment after the first moment. For example, a motion state of the vehicle at a second time point after the first time point is obtained.

In this embodiment, the terminal device may further update the positioning information of the target vehicle based on the motion state of the target vehicle, the positioning information mainly includes the location information and the speed information.

105: The terminal device obtains a constraint matrix corresponding to the motion state in a case that the motion state of the target vehicle at the second moment satisfies a positioning correction condition, the constraint matrix representing a positioning information variation satisfied in the motion state. For example, a constraint matrix corresponding to the motion state is obtained when the motion state of the vehicle at the second time point satisfies a positioning correction condition. The constraint matrix represents a positioning information variation corresponding to the motion state.

In this embodiment, the terminal device needs to determine whether the motion state of the target vehicle at the second moment satisfies the positioning correction condition, and if it is satisfied, continues to obtain the constraint matrix corresponding to the motion state. Conversely, if it is not satisfied, the positioning information at the first moment may be determined as the positioning information at the second moment, or the positioning information at the second moment may be recalculated based on the Doppler observation value and the pseudo range observation value at the second moment.

Specifically, in a case that the positioning correction condition is satisfied, two cases are mainly discussed: one case is to construct a constraint matrix in a stationary state in a case that the target vehicle is in a stationary state, and the other case is to construct a constraint matrix in a straight state in a case that the target vehicle is in a straight state.

106: The terminal device determines a second parameter correction amount corresponding to the target vehicle at the second moment according to the constraint matrix corresponding to the motion state.

In this embodiment, the terminal device calculates the second parameter correction amount based on the constraint matrix in the stationary state, or calculates the second parameter correction amount based on the constraint matrix in the straight state.

107. The terminal device updates the positioning information at the first moment by using the second parameter correction amount, to obtain positioning information of the target vehicle at the second moment. For example, positioning information of the vehicle at the second time point is obtained by modifying the positioning information at the first time point using the second parameter correction amount.

In this embodiment, the terminal device updates the positioning information at the first moment by using the second parameter correction amount, to obtain positioning information of the target vehicle at the second moment.

Figure 4:
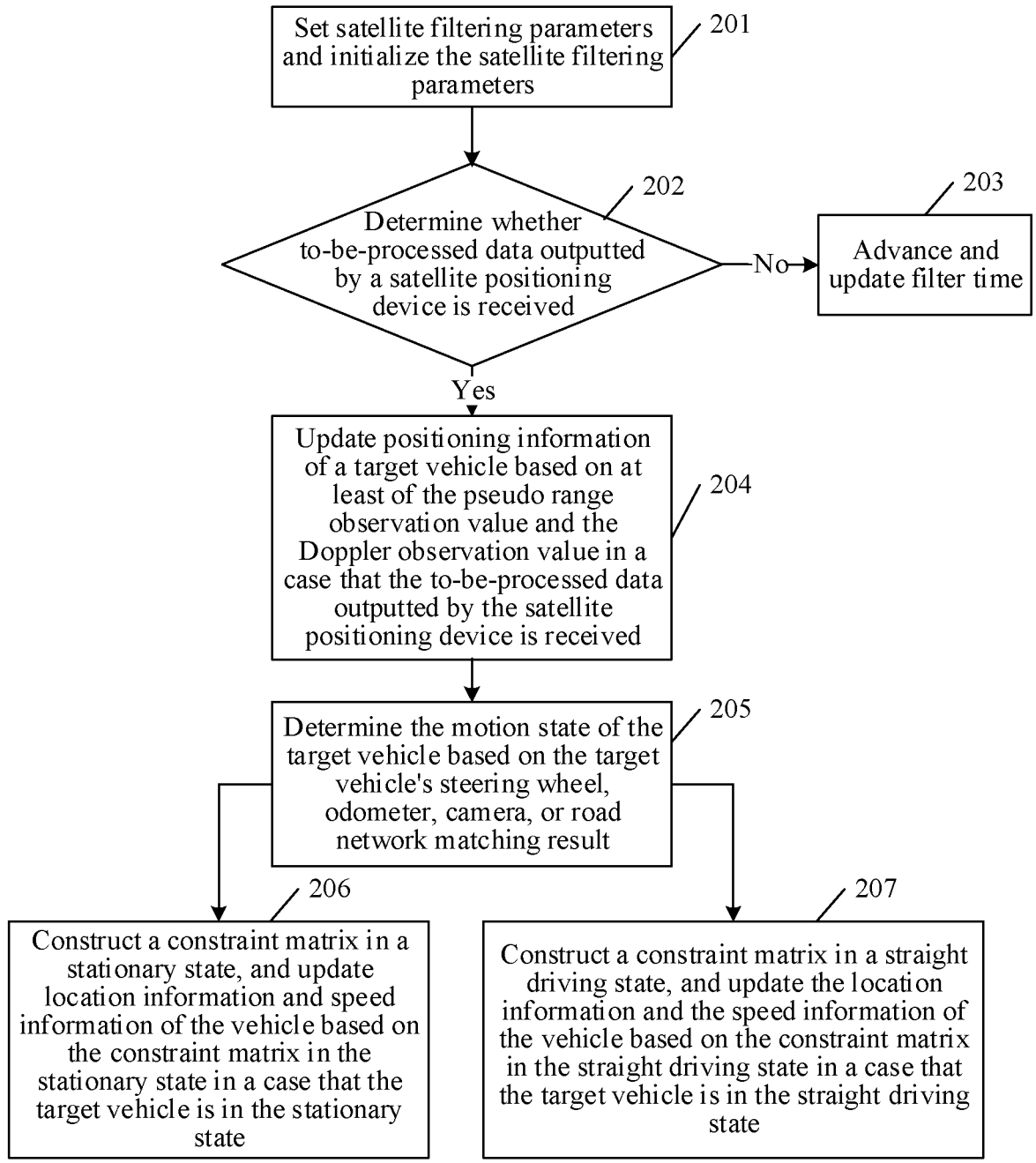
FIG. 4 is a schematic flowchart of a vehicle positioning method according to an embodiment of this disclosure.

For convenience of understanding, reference is made to FIG. 4. FIG. 4 is a schematic flowchart of a vehicle positioning method according to an embodiment of this disclosure. As shown in the figure, specifically:

In step 201, the terminal device (e.g., the in-vehicle terminal) sets satellite filtering parameters and initializes the satellite filtering parameters.

In step 202, the terminal device (e.g., the in-vehicle terminal) determines whether to-be-processed data outputted by a satellite positioning device is received, in a case that the to-be-processed data outputted by the satellite positioning device is received, step 204 is executed, otherwise, in a case that the to-be-processed data outputted by the satellite positioning device is not received, step 203 is executed.

In step 203, the terminal device (e.g., the in-vehicle terminal) advances and updates the filter time, for example, a moment t is advanced to a moment t+1.

In step 204, in a case that the terminal device (e.g., the in-vehicle terminal) receives the to-be-processed data outputted by the satellite positioning device, the positioning information of the target vehicle is updated based on the pseudo range observation value and the Doppler observation value, the positioning information including at least one of the location information and the speed information.

In step 205, the terminal device (e.g., the in-vehicle terminal) determines the motion state of the target vehicle based on the target vehicle's steering wheel, odometer, camera, or road network matching result.

In step 206, in a case that the target vehicle is in the stationary state, the terminal device (e.g., the in-vehicle terminal) constructs a constraint matrix in the stationary state, and updates the location information and the speed information of the vehicle based on the constraint matrix in the stationary state In step 207, in a case that the target vehicle is in the straight driving state, the terminal device (e.g., the in-vehicle terminal) constructs a constraint matrix in the straight driving state, and updates the location information and the speed information of the vehicle based on the constraint matrix in the straight driving state In the embodiments of this disclosure, a vehicle positioning method is provided. Through the manner above, in a case that the vehicle is in a weak satellite signal scenario, the positioning information of the vehicle may be corrected by using at least one of the pseudo range observation value and the Doppler observation value. The pseudo range observation value and the Doppler observation value determined based on satellite ephemeris have higher reliability. Therefore, using the pseudo range observation value and the Doppler observation value to assist in satellite positioning may enhance the reliability of satellite positioning in weak satellite signal scenarios, thereby improving the accuracy of vehicle positioning information. Furthermore, constraints are then constructed based on the vehicle motion state, which may better improve the positioning accuracy.

Based on the embodiment corresponding to FIG. 3, in another embodiment provided by the embodiments of this disclosure, the terminal device obtains the satellite filtering parameters and the to-be-processed data, which may specifically include the following steps:

The terminal device transmits an ephemeris delivery request to a server, so that the server obtains broadcast ephemeris information corresponding to the first moment in response to the ephemeris delivery request, the broadcast ephemeris information including ephemeris parameters corresponding to N satellites, the N being an integer greater than or equal to 1.

The terminal device receives the broadcast ephemeris information corresponding to the first moment transmitted by the server.

The terminal device determines, according to the broadcast ephemeris information corresponding to the first moment, the satellite filtering parameters corresponding to the first moment.

A satellite positioning device obtains the to-be-processed data corresponding to the first moment.

In this embodiment, an approach of obtaining satellite filtering parameters is introduced. The terminal device may obtain satellite location and satellite filtering parameters during the update of the vehicle positioning information by using the pseudo range observation value and the Doppler observation value. Specifically, the terminal device transmits an ephemeris delivery request to a CORS server, to receive broadcast ephemeris information transmitted by the CORS server. The broadcast ephemeris information refers to the broadcast ephemeris information corresponding to the first moment. The broadcast ephemeris information mainly includes a header file and satellite related parameters. The header file includes some basic information of the file, such as ionospheric parameters, data type, a time increment caused by jump seconds, and almanac parameters used for calculating the Universal Time Coordinated (UTC) time. The satellite related parameters include a pseudo random noise code (PRN), clock time, a satellite clock error, orbit eccentricity, ephemeris reference time and so on. On this basis, the terminal device may also calculate the satellite location corresponding to each satellite at the first moment according to the broadcast ephemeris information corresponding to the first moment.

Figure 6:
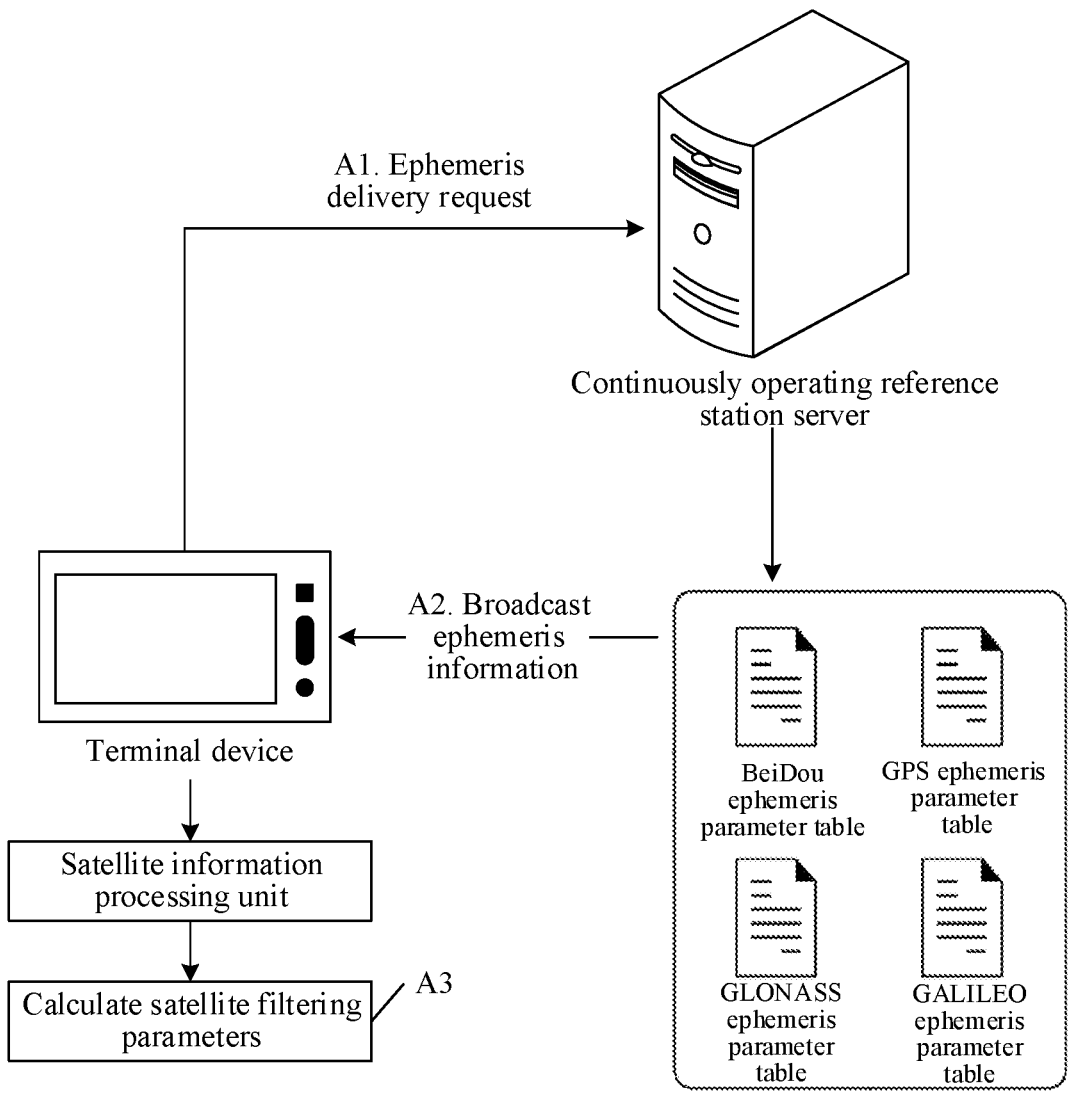
FIG. 6 is a schematic diagram of obtaining satellite filtering parameters according to an embodiment of this disclosure.

For ease of description, reference is made to FIG. 6. FIG. 6 is a schematic diagram of obtaining satellite filtering parameters according to an embodiment of this disclosure. As shown in the figure, specifically:

In step A1, the terminal device transmits an ephemeris delivery request to the CORS server through the $4^{th}$ generation mobile communication technology (4G) network or WIFI network, the ephemeris delivery request carrying a time identity corresponding to the first moment.

In step A2, the CORS server may transmit a real-time broadcast ephemeris information to the terminal device through the 4G network or the WIFI network based on the ephemeris delivery request. The approach of transmitting the broadcast ephemeris information includes but not limited to sending in the form of a binary stream, or sending in the form of a data packet. The broadcast ephemeris information includes ephemeris parameter tables of different satellites, and each ephemeris parameter table may be represented as a set of ephemeris parameters for calculating satellite locations, that is, the broadcast ephemeris information includes ephemeris parameters corresponding to N satellites.

In step A3, the terminal device calculates N satellite locations at a first moment (i.e., a current moment) and satellite filtering parameters through a satellite information processing unit according to the broadcast ephemeris information, the first moment being obtained from the system time of the terminal device (e.g., the in-vehicle terminal) or a pseudo range observation value time scale. It is to be illustrated that the satellite information processing unit may be built in the terminal device, or may be externally placed in the terminal device, which is not limited here.

During the update of the vehicle positioning information by using the pseudo range observation value and the Doppler observation value, the terminal device may obtain the to-be-processed data, that is, obtain at least one of the pseudo range observation value and the Doppler observation value.

Figure 7:
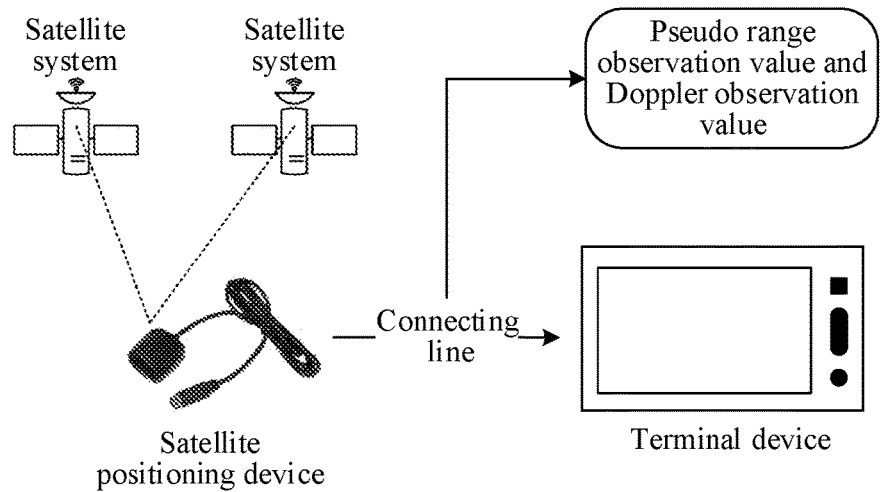
FIG. 7 is a schematic diagram of obtaining to-be-processed data according to an embodiment of this disclosure.

Specifically, for convenience of understanding, reference is made to FIG. 7. FIG. 7 is a schematic diagram of obtaining to-be-processed data according to an embodiment of this disclosure. As shown in the figure, terminal device (e.g., the in-vehicle terminal) receives, through a connecting line (for example, a USB or HDMI connecting line), the pseudo range observation value and the Doppler observation value obtained by the satellite positioning device.

It is to be understood that, the satellite positioning device is configured to track and process a satellite signal and measure a geometrical distance (i.e., the pseudo range observation value) between the terminal device and the satellite and the Doppler effect (i.e., the Doppler observation value) of the satellite signal. The satellite positioning device generally includes modules such as an antenna, a satellite signal tracking loop, and a baseband signal processing module. The terminal device integrated with the satellite positioning device calculates current location coordinates of the terminal device based on the pseudo range observation value and the Doppler observation value. The satellite positioning device is widely used in map navigation, surveying and mapping, aerospace, location services and other fields, such as smart phone map navigation, high-precision geodetic surveying, and civil aviation.

The in-vehicle terminal is mainly composed of three parts, including an in-vehicle (GPS and/or BeiDou) monitoring terminal, a communication network and a dispatch monitoring center. The in-vehicle (GPS and/or BeiDou) monitoring terminal is also known as a car machine, a (GPS and/or BeiDou) terminal or a (GPS and/or BeiDou) monitoring terminal, is responsible for calculating the positioning coordinates according to the received GPS and/or BeiDou satellite signal, and at the same time, transmits positioning information, state information, and transmitting and receiving control information through a communication network. The communication network is a carrier that realizes information exchange between the vehicle and the dispatch monitoring center, generally referring to a Global System for Mobile Communications (GSM), a General Packet Radio Service (GPRS), a Code Division Multiple Access (CDMA) base station and Internet. The dispatch monitoring center is a communication core of the entire information system, and is responsible for information exchange with the in-vehicle GPS monitoring terminal, classification, recording and forwarding of various content and control information.

Secondly, in the embodiments of this disclosure, an approach for obtaining satellite filtering parameters is provided. Through the approach above, the CORS server may deliver real-time broadcast ephemeris information to the terminal device, so that the terminal device may determine the location of each satellite at a current moment according to the broadcast ephemeris information. Since the broadcast ephemeris information has higher real-time performance, the calculated satellite locations are also more accurate. Accurate pseudo range observation value and Doppler observation value may be captured by using the satellite positioning device, thereby improving the feasibility and operability of the solution.

Based on the embodiment corresponding to FIG. 3, in another embodiment provided by the embodiments of this disclosure, the satellite filtering parameters include the location information corresponding to the target vehicle at the first moment, and the to-be-processed data includes the pseudo range observation value corresponding to the target vehicle at the first moment.

The terminal device determines a first parameter correction amount corresponding to the target vehicle at the first moment according to the satellite filtering parameters and the to-be-processed data, which may specifically include the following steps:

The terminal device obtains a covariance matrix corresponding to the first moment.

The terminal device obtains a first Jacobian matrix corresponding to N unit observation vectors, each unit observation vector included in the N unit observation vectors representing a direction vector of a connecting line between a satellite and the target vehicle.

The terminal device obtains a pseudo range measurement error matrix corresponding to the first moment.

The terminal device obtains a first gain matrix corresponding to the first moment.

The terminal device determines a first prediction residual vector according to the satellite filtering parameters and the pseudo range observation value corresponding to the first moment.

The terminal device determines the first parameter correction amount corresponding to the target vehicle at the first moment according to the covariance matrix corresponding to the first moment, the first Jacobian matrix, the pseudo range measurement error matrix, the first gain matrix and the first prediction residual vector.

In this embodiment, an approach of determining the first parameter correction amount based on the pseudo range observation value is introduced. First, in response to constructing a location and speed filter for the terminal device (e.g., the in-vehicle terminal), the location information, the speed information, the clock skew, and the clock skew change rate are set as the satellite filtering parameter, which is expressed as:

$$X = [x y z v_x v_y v_z dt^{GPS} dt^{GLO} dt^{GAL} dt^{BDS} dtr]^T;$$

where X represents the satellite filtering parameter, x represents an x-axis coordinate of the vehicle, y represents a y-axis coordinate of the vehicle, z represents a z-axis coordinate of the vehicle, $v_x$ represents a speed of the vehicle in the x-axis direction, $v_y$ represents a speed of the vehicle in the y-axis direction, $v_z$ represents a speed of the vehicle in the z-axis direction, $dt^{GPS}$ represents a clock skew of a satellite positioning device clock relative to the GPS, $dt^{GLO}$ represents a clock skew of the satellite positioning device clock relative to the GLONASS, $dt^{BDS}$ represents a clock skew of the satellite positioning device clock relative to the GALILEO, $dt^{BBDS}$ represents a clock skew of the satellite positioning device clock relative to the BeiDou system, and dtr represents a clock skew change rate of the satellite positioning device.

On this basis, it is necessary to initialize the satellite filtering parameters. The initial location information may be given by a network positioning result or an output result of the satellite positioning device, and the initial speed information may be given by a speed outputted by the satellite positioning device or set to zero. The clock skew $dt^{GPS}$, the clock skew $dt^{GLO}$, the clock skew $dt^{GAL}$ and the clock skew $dt^{BDS}$ of the satellite positioning device are set to 0, and the clock skew change rate dtr of the satellite positioning device is set to zero. The initialized satellite filtering parameter is expressed as:

$$X(t_0) = [x_0 y_0 z_0 v_{x0} v_{y0} v_{z0} 0 0 0 0 0];$$

where $X(t_0)$ represents the initialized satellite filtering parameter, $x_0$ represents an initial x-coordinate of the vehicle, $y_0$ represents an initial y-coordinate of the vehicle, $z_0$ represents an initial z-coordinate of the vehicle, $v_{x0}$ represents an initial speed of the vehicle in the x-axis direction, $v_{y0}$ represents an initial speed of the vehicle in the y-axis direction, and $v_{z0}$ represents an initial speed of the vehicle in the z-axis direction.

In addition, a filtered covariance matrix may also be set, and the covariance matrix is initialized to obtain the following form:

$$P(t_0) = \text{diag}(10^6, 11);$$

where $P(t_0)$ represents the initialized covariance matrix, $\text{diag}(10^6, 11)$ represents an 11-dimensional diagonal matrix whose diagonal elements are all $10^6$.

Combined with the above introduction, assuming that a filtering parameter at a moment $t_k$ is $X(t_k)$, then a filtering parameters at the next moment (that is, the current moment or the first moment) $t_{k+1}$ is:

$$X(t_{k+1}) = F \cdot X(t_k);$$

where $X(t_{k+1})$ represents a satellite filtering parameter corresponding to the first moment, $X(t_k)$ represents a satellite filtering parameter corresponding to a moment before the first moment, and F represents a state transition matrix of the system.

In addition, assuming that a covariance matrix of the filtering parameter at the moment $t_k$ is $P(t_k)$, then a covariance matrix of the filtering parameter at the next moment (that is, the current moment or the first moment) $t_{k+1}$ is:

$$P(t_{k+1}) = F \cdot P(t_k) \cdot F^T + Q(t_{k+1});$$

where $P(t_{k+1})$ represents a covariance matrix corresponding to the first moment, $P(t_k)$ represents a covariance matrix corresponding to the previous moment, F represents the state transition matrix of the system, and $Q(t_{k+1})$ represents a system noise matrix corresponding to the first moment. The system noise matrix corresponding to the first moment is represented as:

$$Q(t_{k+1}) = \begin{bmatrix} \frac{S_x dt^3}{3} & 0 & 0 & \frac{S_x dt^2}{2} & \frac{S_y dt^2}{2} & \frac{S_z dt^2}{2} & 0 & 0 & 0 & 0 & 0 \\ 0 & \frac{S_y dt^3}{3} & 0 & 0 & 0 & 0 & 0 & 0 & 0 & 0 & 0 \\ 0 & 0 & \frac{S_z dt^3}{3} & 0 & 0 & 0 & 0 & 0 & 0 & 0 & 0 \\ \frac{S_x dt^2}{2} & 0 & 0 & S_x dt & 0 & 0 & 0 & 0 & 0 & 0 & 0 \\ \frac{S_x dt^2}{2} & 0 & 0 & 0 & S_y dt & 0 & 0 & 0 & 0 & 0 & 0 \\ \frac{S_x dt^2}{2} & 0 & 0 & 0 & 0 & S_z dt & 0 & 0 & 0 & 0 & 0 \\ 0 & 0 & 0 & 0 & 0 & 0 & S_f + \frac{S_g dt^3}{3} & 0 & 0 & 0 & \frac{S_g dt^2}{2} \\ 0 & 0 & 0 & 0 & 0 & 0 & 0 & S_f + \frac{S_g dt^3}{3} & 0 & 0 & \frac{S_g dt^2}{2} \\ 0 & 0 & 0 & 0 & 0 & 0 & 0 & 0 & S_f + \frac{S_g dt^3}{3} & 0 & \frac{S_g dt^2}{2} \\ 0 & 0 & 0 & 0 & 0 & 0 & 0 & 0 & 0 & S_f + \frac{S_g dt^3}{3} & \frac{S_g dt^2}{2} \\ 0 & 0 & 0 & 0 & 0 & 0 & \frac{S_g dt^2}{2} & \frac{S_g dt^2}{2} & \frac{S_g dt^2}{2} & \frac{S_g dt^2}{2} & S_g dt \end{bmatrix};$$

$dt = t_{k+1} - t_k;$ $$F = \begin{bmatrix} 1 & 0 & 0 & dt & 0 & 0 & 0 & 0 & 0 & 0 \\ 0 & 1 & 0 & 0 & dt & 0 & 0 & 0 & 0 & 0 \\ 0 & 0 & 1 & 0 & 0 & dt & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & dt \\ 0 & 0 & 0 & 0 & 0 & 0 & 0 & 1 & 0 & dt \\ 0 & 0 & 0 & 0 & 0 & 0 & 0 & 0 & 1 & dt \\ 0 & 0 & 0 & 0 & 0 & 0 & 0 & 0 & 0 & 1 \end{bmatrix};$$

where $S_x$ represents a density spectrum of acceleration in the x-axis direction, $S_y$ represents a density spectrum of acceleration in the y-axis direction, $S_z$ represents a density spectrum of acceleration in the z-axis direction, $S_f$ represents a clock frequency drift spectral density of the satellite positioning device, and $S_g$ represents a clock phase drift spectral density of the satellite positioning device relative to the previous moment.

Combined with the introduction above, in response to calculating the first parameter correction amount of the target vehicle at the first moment, it is necessary to obtain the pseudo range observation value. Assuming that at the first moment $t_{k+1}$, the terminal device receives the pseudo range observation values of N satellite signals fed back by the satellite positioning device, including m BeiDou satellites, n GPS satellites, p GLONASS satellites and q GALILEO satellites, the pseudo range observation values are:

$$\begin{bmatrix} \rho_{BDS,1} \\ \vdots \\ \rho_{BDS,m} \\ \rho_{GPS,1} \\ \vdots \\ \rho_{GPS,n} \\ \rho_{GLO,1} \\ \vdots \\ \rho_{GLO,p} \\ \rho_{GAL,1} \\ \vdots \\ \rho_{GAL,q} \end{bmatrix};$$

where $\rho_{PBDS,1}$ represents a pseudo range observation value of the first BeiDou satellite, $\rho_{PBDS,m}$ represents a pseudo range observation value of the m$^{th}$ BeiDou satellite, $\rho_{GPS,1}$ represents a pseudo range observation value of the first GPS satellite, $\rho_{PGS,n}$ represents a pseudo range observation value of the n$^{th}$ GPS satellite, $\rho_{GLO,1}$ represents a pseudo range observation value of the first GLONASS satellite, $\rho_{GLO,p}$ represents a pseudo range observation value of the $p^{th}$ GLONASS satellite, $\rho_{GAL,1}$ represents a pseudo range observation value of the first GALILEO satellite, and $\rho_{GAL,q}$ represents a pseudo range observation value of the $q^{th}$ GALILEO satellite.

It is to be illustrated that m, n, p, and q may be integers greater than or equal to 0, and the sum of m+n+p+q is equal to N, N being an integer greater than or equal to 1.

In this case, the terminal device determines a first prediction residual vector according to the satellite filtering parameters and the pseudo range observation value corresponding to the first moment, that is, the first prediction residual vector is calculated in the following manner:

$$\delta z = \begin{bmatrix} \rho_{BDS,1} \\ \vdots \\ \rho_{BDS,m} \\ \rho_{GPS,1} \\ \vdots \\ \rho_{GPS,n} \\ \rho_{GLO,1} \\ \vdots \\ \rho_{GLO,p} \\ \rho_{GAL,1} \\ \vdots \\ \rho_{GAL,q} \end{bmatrix} - \begin{bmatrix} \|r(t_{k+1}) - r^{GPS,1}\| + c \cdot dt^{GPS}(t_{k+1}) - c \cdot dt^{GPS,1} + \eta^{GPS,1} \\ \vdots \\ \|r(t_{k+1}) - r^{GPS,n}\| + c \cdot dt^{GPS}(t_{k+1}) - c \cdot dt^{GPS,n} + \eta^{GPS,n} \\ \|r(t_{k+1}) - r^{GLO,1}\| + c \cdot dt^{GLO}(t_{k+1}) - c \cdot dt^{GLo,1} + \eta^{GLO,1} \\ \vdots \\ \|r(t_{k+1}) - r^{GLO,p}\| + c \cdot dt^{GLO}(t_{k+1}) - c \cdot dt^{GLO,p} + \eta^{GLO,p} \\ \|r(t_{k+1}) - r^{GAL,1}\| + c \cdot dt^{GAL}(t_{k+1}) - c \cdot dt^{GAL,1} + \eta^{GAL,1} \\ \vdots \\ \|r(t_{k+1}) - r^{GAL,q}\| + c \cdot dt^{GAL}(t_{k+1}) - c \cdot dt^{GAL,q} + \eta^{GAL,q} \\ \|r(t_{k+1}) - r^{BDS,1}\| + c \cdot dt^{BDS}(t_{k+1}) - c \cdot dt^{BDS,1} + \eta^{BDS,1} \\ \vdots \\ \|r(t_{k+1}) - r^{BDS,m}\| + c \cdot dt^{BDS}(t_{k+1}) - c \cdot dt^{BDS,m} + \eta^{BDS,m} \end{bmatrix};$$

$i = 1, 2, \ldots \ldots, N;$ where $\delta Z$ represents the first prediction residual vector, $t_{k+1}$ represents the first moment, $r(t_{k+1})$ represents location information of the target vehicle at the first moment (the location information is derived from the satellite filtering parameters), $r^i$ represents a satellite location of an $i^{th}$ satellite (for example, $r^{GPS,1}$ represents the satellite location of the first GPS satellite, and $r^{GPS,n}$ represents the satellite location of the $n^{th}$ GPS satellite), c represents a value of the speed of light in vacuum, and $dt^i$ represents a clock skew of the $i^{th}$ satellite, and the above parameters may be calculated from the satellite real-time navigation ephemeris, that is, calculated from the broadcast ephemeris information at the first moment. $\eta^i$, i=1, 2, . . . , N represents the number of error corrections (including ionosphere, troposphere and S-earth rotation corrections), and the above parameters may be calculated by empirical models.

On this basis, the terminal device determines the first parameter correction amount corresponding to the target vehicle at the first moment according to the covariance matrix corresponding to the first moment, the first Jacobian matrix, the pseudo range measurement error matrix, the first gain matrix and the first prediction residual vector. That is, a calculation approach of the first parameter correction amount is:

$$\delta X(t_{k+1}) = \begin{bmatrix} \delta x(t_{k+1}) \\ \delta y(t_{k+1}) \\ \delta z(t_{k+1}) \\ \delta v_x(t_{k+1}) \\ \delta v_y(t_{k+1}) \\ \delta v_z(t_{k+1}) \\ \delta dt^{GPS}(t_{k+1}) \\ \delta dt^{GLO}(t_{k+1}) \\ \delta dt^{GAL}(t_{k+1}) \\ \delta dt^{BDS}(t_{k+1}) \\ \delta dtr(t_{k+1}) \end{bmatrix} = \underbrace{P(t_{k+1}) \cdot H^T \left( H \cdot P(t_{k+1}) \cdot H^T + R_\rho(t_{k+1}) \right)^{-1}}_{K(t_{k+1})} \cdot \delta z;$$

where $\delta X(t_{k+1})$ represents a first parameter correction amount corresponding to the target vehicle at the first moment, $P(t_{k+1})$ represents a covariance matrix corresponding to the first moment, H represents a first Jacobian matrix, $R_\rho(t_{k+1})$ represents a pseudo range measurement error matrix corresponding to the first moment (directly obtained by the satellite positioning device), $\delta Z$ represents a first prediction residual vector, and $K(t_{k+1})$ represents a first gain matrix corresponding to the first moment.

Specifically, the first Jacobian matrix is determined based on the N unit observation vectors, each unit observation vector is used for representing a direction vector of a connecting line between the satellite and the target vehicle. The first Jacobian matrix is calculated by using the following approach:

$$H = \begin{bmatrix} -e^{GPS,1T} & 0_{1\times 3} & 1 & 0 & 0 & 0 & 0 \\ & \vdots & & & & & \\ -e^{GPS,nT} & 0_{1\times 3} & 1 & 0 & 0 & 0 & 0 \\ -e^{GLO,1T} & 0_{1\times 3} & 0 & 1 & 0 & 0 & 0 \\ & \vdots & & & & & \\ -e^{GLO,pT} & 0_{1\times 3} & 0 & 1 & 0 & 0 & 0 \\ -e^{GPS,1T} & 0_{1\times 3} & 0 & 0 & 1 & 0 & 0 \\ & \vdots & & & & & \\ -e^{GAL,qT} & 0_{1\times 3} & 0 & 0 & 1 & 0 & 0 \\ -e^{BDS,1T} & 0_{1\times 3} & 0 & 0 & 0 & 1 & 0 \\ & \vdots & & & & & \\ -e^{BDS,mT} & 0_{1\times 3} & 0 & 0 & 0 & 1 & 0 \end{bmatrix};$$

$$\sigma_{\rho i} = \left(5 \cdot 10^{\frac{45-CN0}{10}}\right)^2, i = 1, 2, \ldots \ldots, N;$$

$$R_\rho(t_{k+1}) = \begin{bmatrix} \sigma_{\rho 1} & \cdots & 0 \\ \vdots & \ddots & \vdots \\ 0 & \cdots & \sigma_{\rho N} \end{bmatrix};$$

$$r(t_{k+1}) = \begin{bmatrix} x(t_{k+1}) \\ y(t_{k+1}) \\ z(t_{k+1}) \end{bmatrix};$$

where H represents the first Jacobian matrix, $e^i$ represents a unit observation vector from an $i^{th}$ satellite to the target vehicle, which is a direction vector of a connecting line between the two space points, namely, the satellite and the terminal device, $\sigma_{\rho i}$ represents a variance value of the measurement noise, CN0 represents a carrier-to-noise ratio of the $i^{th}$ satellite, $r(t_{k+1})$ represents location information of the target vehicle at the first moment, $x(t_{k+1})$ represents the x-axis coordinate of the target vehicle at the first moment, y($t_{k+1}$) represents the y-axis coordinate of the target vehicle at the first moment, and z($t_{k+1}$) represents the z-axis coordinate of the target vehicle at the first moment. Furthermore, the calculation approach of $e^i$ is as follows:

$$e^i = \frac{r^j(t_{k+1}) - r(t_{k+1})}{\|r^j(t_{k+1}) - r(t_{k+1})\|};$$

where $r^i$ represents a satellite location of the $i^{th}$ satellite, and r($t_{k+1}$) represents the location information of the target vehicle at the first moment.

It is to be illustrated that in a case that the satellite filtering parameters include the location information corresponding to the target vehicle at the first moment, but do not include the speed information, the speed information in the satellite filtering parameters is set to 0.

During the obtaining of the first parameter correction amount $\delta X(t_{k+1})$, the satellite filtering parameter $X(t_{k+1})$ is updated to obtain positioning information of the target vehicle at the first moment, that is, the positioning information is updated by using the following approach:

$$\overline{X}(t_{k+1}) = X(t_{k+1}) + \delta X(t_{k+1});$$

where $\overline{X}(t_{k+1})$ represents the positioning information of the target vehicle at the first moment, $X(t_{k+1})$ represents the satellite filtering parameter, and $\delta X(t_{k+1})$ represents the first parameter correction amount corresponding to the target vehicle at the first moment.

In addition, the covariance matrix of the filtering parameter may also be updated by using the following approach:

$$\overline{P}(t_{k+1}) = (I_{11 \times 11} - K(t_{k+1}) \cdot H) \cdot P(t_{k+1});$$

where $\overline{P}(t_{k+1})$ represents an updated covariance matrix at the first moment, $I_{11 \times 11}$ represents a matrix of 11×11, H represents a first Jacobian matrix, P($t_{k+1}$) represents the covariance matrix at the first moment, and K($t_{k+1}$) represents the first gain matrix corresponding to the first moment.

It is to be illustrated that the parameter correction amount (e.g., the first parameter correction amount) is used for correcting the location information and the speed information of the target vehicle, and the covariance matrix represents the accuracy of the location information and the speed information of the target vehicle.

Secondly, in the embodiments of this disclosure, a method for determining a first parameter correction amount based on a pseudo range observation value is provided. Through the above method, the satellite filtering parameters are corrected by using the pseudo range observation value, and the pseudo range observation value determined based on the satellite ephemeris has higher reliability. Therefore, satellite positioning assistance may enhance the accuracy of satellite positioning in weak satellite signal scenarios, thereby improving the accuracy of vehicle positioning information.

Based on the embodiment corresponding to FIG. 3, in another embodiment provided by the embodiments of this disclosure, the satellite filtering parameters include the speed information corresponding to the target vehicle at the first moment, and the to-be-processed data includes the Doppler observation value corresponding to the target vehicle at the first moment.

The terminal device determines a first parameter correction amount corresponding to the target vehicle at the first moment according to the satellite filtering parameters and the to-be-processed data, which may specifically include the following steps:

The terminal device obtains a covariance matrix corresponding to the first moment.

The terminal device obtains a second Jacobian matrix corresponding to N unit observation vectors, each unit observation vector included in the N unit observation vectors representing a direction vector of a connecting line between the satellite and the target vehicle.

The terminal device obtains a Doppler measurement error matrix corresponding to the first moment.

The terminal device obtains a second gain matrix corresponding to the first moment.

The terminal device determines a second prediction residual vector according to the satellite filtering parameters and the Doppler observation value corresponding to the first moment.

The terminal device determines the first parameter correction amount corresponding to the target vehicle at the first moment according to the covariance matrix corresponding to the first moment, the second Jacobian matrix, the Doppler measurement error matrix, the second gain matrix and the second prediction residual vector.

In this embodiment, an approach of determining the first parameter correction amount based on the Doppler observation value is introduced. Similar to the foregoing embodiment, in response to constructing a location and speed filter of the terminal device (e.g., the in-vehicle terminal), the location information, the speed information, the clock skew and the clock skew change rate are set as satellite filtering parameters, it is necessary to initialize the satellite filtering parameters. The initial location information may be given by a network positioning result or an output result of the satellite positioning device, and the initial speed information may be given by a speed outputted by the satellite positioning device or set to zero.

Combined with the above introduction, assuming that a filtering parameter at a moment $t_k$ is $X(t_k)$, then a filtering parameters at the next moment (that is, the current moment or the first moment) $t_{k+1}$ is:

$$X(t_{k+1}) = F \cdot X(t_k);$$

where $X(t_{k+1})$ represents a satellite filtering parameter corresponding to the first moment, $X(t_k)$ represents a satellite filtering parameter corresponding to a moment before the first moment, and F represents a state transition matrix of the system.

In addition, assuming that a covariance matrix of the filtering parameter at the moment $t_k$ is $P(t_k)$, then a covariance matrix of the filtering parameter at the next moment (that is, the current moment or the first moment) $t_{k+1}$ is:

$$P(t_{k+1}) = F \cdot P(t_k) \cdot F^T + Q(t_{k+1});$$

where P($t_{k+1}$) represents a covariance matrix corresponding to the first moment, P($t_k$) represents a covariance matrix corresponding to the previous moment, F represents the state transition matrix of the system, and Q($t_{k+1}$) represents a system noise matrix corresponding to the first moment. It is to be understood that an approach of calculating the system noise matrix at the first moment is similar to the foregoing embodiment, and details are not described here.

Combined with the introduction above, in response to calculating the first parameter correction amount of the target vehicle at the first moment, it is necessary to obtain the Doppler observation value. Assuming that at the first moment $t_{k+1}$, the terminal device receives the Doppler observation values of N satellite signals fed back by the satellite positioning device, the pseudo range observation values are represented as: $\dot{\rho}_i$, i=1, 2, 3, . . . , N.

In this case, the terminal device determines a second prediction residual vector according to the satellite filtering parameters and the Doppler observation value corresponding to the first moment, that is, the second prediction residual vector is calculated in the following manner:

$$\delta \dot{z} = \begin{bmatrix} \dot{\rho}_1 - ((v^1 - v(t_{k+1})) \cdot e^{1T} + dtr - c \cdot \dot{dt}^1(t_{k+1})) \\ \dot{\rho}_2 - ((v^2 - v(t_{k+1})) \cdot e^{2T} + dtr - c \cdot \dot{dt}^2(t_{k+1})) \\ \vdots \\ \dot{\rho}_N - ((v^N - v(t_{k+1})) \cdot e^{NT} + dtr - c \cdot \dot{dt}^N(t_{k+1})) \end{bmatrix};$$

where $\delta \dot{Z}$ represents the second prediction residual vector, $t_{k+1}$ represents the first moment, $\dot{\rho}_i$, i=1,2,3, . . . , N represents the pseudo range observation value, $v^i$ represents a speed of an $i^{th}$ satellite, $v(t_{k+1})$ represents speed information of the target vehicle at the first moment (the speed information is derived from the satellite filtering parameters), $r^i$ represents a satellite location of the $i^{th}$ satellite (for example, $r^{GPS,1}$ represents the satellite location of the first GPS satellite, and $r^{GPS,n}$ represents the satellite location of the $n^{th}$ GPS satellite), c represents a value of the speed of light in vacuum, dtr represents a clock skew change rate of the satellite positioning device, and $\dot{dt}^i(t_{k+1})$ represents a clock skew change rate of the $i^{th}$ satellite. The above parameters may be calculated by satellite real-time navigation ephemeris, that is, calculated from the broadcast ephemeris information at the first moment.

On this basis, the terminal device determines the first parameter correction amount corresponding to the target vehicle at the first moment according to the covariance matrix corresponding to the first moment, the second Jacobian matrix, the Doppler measurement error matrix, the second gain matrix and the second prediction residual vector. That is, a calculation approach of the first parameter correction amount is:

$$\delta \check{X}(t_{k+1}) = \underbrace{P(t_{k+1}) \cdot M^T (M \cdot P(t_{k+1}) \cdot M^T + R_{\dot{\rho}}(t_4))^{-1}}_{\check{K}(t_4)} \cdot \delta \dot{z};$$

where $\delta \check{X}(t_{k+1})$ represents a first parameter correction amount corresponding to the target vehicle at the first moment, $P(t_{k+1})$ represents a covariance matrix corresponding to the first moment, M represents a second Jacobian matrix, $R_{\dot{\rho}}(t_4)$ represents a Doppler measurement error matrix corresponding to the first moment (directly obtained by the satellite positioning device), $\delta \dot{Z}$ represents a second prediction residual vector, and $\check{K}(t_4)$ represents a second gain matrix corresponding to the first moment.

Specifically, the second Jacobian matrix is determined based on the N unit observation vectors, each unit observation vector is used for representing a direction vector of a connecting line between the satellite and the target vehicle. The second Jacobian matrix is calculated by using the following approach:

$$M = \begin{bmatrix} 0_{1\times 3} & -e^{GPS,1T} & 0 & 0 & 0 & 1 \\ & \vdots & & & & \\ 0_{1\times 3} & -e^{GPS,nT} & 0 & 0 & 0 & 1 \\ 0_{1\times 3} & -e^{GLO,1T} & 0 & 0 & 0 & 1 \\ & \vdots & & & & \\ 0_{1\times 3} & -e^{GLO,pT} & 0 & 0 & 0 & 1 \\ 0_{1\times 3} & -e^{GAL,1T} & 0 & 0 & 0 & 1 \\ & \vdots & & & & \\ 0_{1\times 3} & -e^{GAL,qT} & 0 & 0 & 0 & 1 \\ 0_{1\times 3} & -e^{BDS,1T} & 0 & 0 & 0 & 1 \\ & \vdots & & & & \\ 0_{1\times 3} & -e^{BDS,mT} & 0 & 0 & 0 & 1 \end{bmatrix};$$

$$R_{\dot{\rho}}(t_{k+1}) = \begin{bmatrix} \sigma_{\dot{\rho}1} & \cdots & 0 \\ \vdots & \ddots & \vdots \\ 0 & \cdots & \sigma_{\dot{\rho}N} \end{bmatrix};$$

$$\sigma_{\dot{\rho}i} = \left(0.3 \cdot 10^{\frac{45-CN0}{10}}\right)^2, i = 1, 2, \ldots \ldots, N;$$

$$v(t_{k+1}) = \begin{bmatrix} v_x(t_{k+1}) \\ v_y(t_{k+1}) \\ v_z(t_{k+1}) \end{bmatrix};$$

where M represents the second Jacobian matrix, $e^i$ represents a unit observation vector from an $i^{th}$ satellite to the target vehicle, which is a direction vector of a connecting line between the two space points, namely, the satellite and the terminal device, $\sigma_{\dot{\rho}i}$ represents a variance value of the measurement noise, CN0 represents a carrier-to-noise ratio of the $i^{th}$ satellite, $v(t_{k+1})$ represents speed information of the target vehicle at the first moment, $v_x(t_{k+1})$ represents the speed information of the target vehicle at the first moment in the x-axis direction, $v_y(t_{k+1})$ represents the speed information of the target vehicle at the first moment in the y-axis direction, and $v_z(t_{k+1})$ represents the speed information of the target vehicle at the first moment in the z-axis direction. Furthermore, the calculation approach of $e^i$ is as follows:

$$e^i = \frac{r^i(t_{k+1}) - r(t_{k+1})}{\|r^i(t_{k+1}) - r(t_{k+1})\|};$$

where $r^i$ represents a satellite location of the $i^{th}$ satellite, and $r(t_{k+1})$ represents the location information of the target vehicle at the first moment.

It is to be illustrated that in a case that the satellite filtering parameters include the speed information corresponding to the target vehicle at the first moment, but do not include the location information, the location information in the satellite filtering parameters is set to 0. It is to be understood that m, n, p, and q may be integers greater than or equal to 0, and the sum of m+n+p+q is equal to N, N being an integer greater than or equal to 1.

During the obtaining of the first parameter correction amount $\delta \check{X}(t_{k+1})$, the satellite filtering parameter $X(t_{k+1})$ is updated to obtain positioning information of the target vehicle at the first moment, that is, the positioning information is updated by using the following approach:

$$\overline{X}(t_{k+1}) = X(t_{k+1}) + \delta \check{X}(t_{k+1});$$

where $\overline{X}(t_{k+1})$ represents the positioning information of the target vehicle at the first moment, $X(t_{k+1})$ represents the satellite filtering parameter, and $\delta \check{X}(t_{k+1})$ represents the first parameter correction amount corresponding to the target vehicle at the first moment.

In addition, the covariance matrix of the filtering parameter may also be updated by using the following approach:

$$\overline{P}(t_{k+1})=(I_{11\times 11}-\breve{K}(t_4)\cdot M)\cdot P(t_{k+1});$$

where $\overline{P}(t_{k+1})$ represents an updated covariance matrix at the first moment, $I_{11\times 11}$ represents a matrix of 11×11, M represents a second Jacobian matrix, $P(t_{k+1})$ represents the covariance matrix at the first moment, and $\breve{K}(t_4)$ represents the second gain matrix corresponding to the first moment.

It is to be illustrated that the parameter correction amount (e.g., the first parameter correction amount) is used for correcting the location information and the speed information of the target vehicle, and the covariance matrix represents the accuracy of the location information and the speed information of the target vehicle.

Secondly, in the embodiments of this disclosure, a method for determining a first parameter correction amount based on a Doppler observation value is provided. Through the above method, the satellite filtering parameters are corrected by using the Doppler observation value, and the Doppler observation value determined based on the satellite ephemeris has higher reliability. Therefore, satellite positioning assistance may enhance the accuracy of satellite positioning in weak satellite signal scenarios, thereby improving the accuracy of vehicle positioning information.

Based on the embodiment corresponding to FIG. 3, in another embodiment provided by the embodiments of this disclosure, the satellite filtering parameters include the speed information and the location information corresponding to the target vehicle at the first moment, and the to-be-processed data includes the pseudo range observation value and the Doppler observation value corresponding to the target vehicle at the first moment.

The terminal device determines a first parameter correction amount corresponding to the target vehicle at the first moment according to the satellite filtering parameters and the to-be-processed data, which may specifically include the following steps:

The terminal device obtains a covariance matrix corresponding to the first moment.

The terminal device obtains a first Jacobian matrix corresponding to N unit observation vectors, each unit observation vector included in the N unit observation vectors representing a direction vector of a connecting line between a satellite and the target vehicle.

The terminal device obtains a pseudo range measurement error matrix corresponding to the first moment.

The terminal device obtains a first gain matrix corresponding to the first moment.

The terminal device determines a first prediction residual vector according to the satellite filtering parameters and the pseudo range observation value corresponding to the first moment.

The terminal device determines a target parameter correction amount corresponding to the target vehicle at the first moment according to the covariance matrix corresponding to the first moment, the first Jacobian matrix, the pseudo range measurement error matrix, the first gain matrix and the first prediction residual vector, the target parameter correction amount being used for updating the satellite filtering parameters.

The terminal device determines a target covariance matrix according to the covariance matrix corresponding to the first moment, the first gain matrix and the first Jacobian matrix.

The terminal device determines a first parameter correction amount corresponding to the target vehicle at the first moment according to the target covariance matrix.

In this embodiment, an approach of determining the first parameter correction amount based on the pseudo range observation value and the Doppler observation value is introduced. Similar to the foregoing embodiment, in response to constructing a location and speed filter of the terminal device (e.g., the in-vehicle terminal), the location information, the speed information, the clock skew and the clock skew change rate are set as satellite filtering parameters, it is necessary to initialize the satellite filtering parameters. The initial location information may be given by a network positioning result or an output result of the satellite positioning device, and the initial speed information may be given by a speed outputted by the satellite positioning device or set to zero.

Combined with the above introduction, assuming that a filtering parameter at a moment $t_k$ is $X(t_k)$, and a filtering parameters at the next moment (that is, the current moment or the first moment) $t_{k+1}$ is:

$$X(t_{k+1})=F\cdot X(t_k);$$

where $X(t_{k+1})$ represents a satellite filtering parameter corresponding to the first moment, $X(t_k)$ represents a satellite filtering parameter corresponding to a moment before the first moment, and F represents a state transition matrix of the system.

In addition, assuming that a covariance matrix of the filtering parameter at the moment $t_k$ is $P(t_k)$, then a covariance matrix of the filtering parameter at the next moment (that is, the current moment or the first moment) $t_{k+1}$ is:

$$P(t_{k+1})=F\cdot P(t_k)\cdot F^T+Q(t_{k+1});$$

where $P(t_{k+1})$ represents a covariance matrix corresponding to the first moment, $P(t_k)$ represents a covariance matrix corresponding to the previous moment, F represents the state transition matrix of the system, and $Q(t_{k+1})$ represents a system noise matrix corresponding to the first moment. It is to be understood that an approach of calculating the system noise matrix at the first moment is similar to the foregoing embodiment, and details are not described here.

Combined with the introduction above, in response to calculating the first parameter correction amount of the target vehicle at the first moment, it is necessary to obtain the pseudo range observation value. Assuming that at the first moment $t_{k+1}$, the terminal device receives the pseudo range observation values of N satellite signals fed back by the satellite positioning device, including m BeiDou satellites, n GPS satellites, p GLONASS satellites and q GALILEO satellites, the pseudo range observation values are:

$$\begin{bmatrix} \rho_{BDS,1} \\ \vdots \\ \rho_{BDS,m} \\ \rho_{GPS,1} \\ \vdots \\ \rho_{GPS,n} \\ \rho_{GLO,1} \\ \vdots \\ \rho_{GLO,p} \\ \rho_{GAL,1} \\ \vdots \\ \rho_{GAL,q} \end{bmatrix};$$

where $\rho_{PBDS,1}$ represents a pseudo range observation value of the first BeiDou satellite, $\rho_{PBDS,m}$ represents a pseudo range observation value of the $m^{th}$ BeiDou satellite, $\rho_{GPS,1}$ represents a pseudo range observation value of the first GPS satellite, $\rho_{PGS,n}$ represents a pseudo range observation value of the $n^{th}$ GPS satellite, $\rho_{GLO,1}$ represents a pseudo range observation value of the first GLONASS satellite, $\rho_{GLO,p}$ represents a pseudo range observation value of the $p^{th}$ GLONASS satellite, $\rho_{GAL,1}$ represents a pseudo range observation value of the first GALILEO satellite, and $\rho_{GAL,q}$ represents a pseudo range observation value of the $q^{th}$ GALILEO satellite.

It is to be illustrated that m, n, p, and q may be integers greater than or equal to 0, and the sum of m+n+p+q is equal to N, N being an integer greater than or equal to 1.

In this case, the terminal device determines a first prediction residual vector according to the satellite filtering parameters and the pseudo range observation value corresponding to the first moment, that is, the first prediction residual vector is calculated in the following manner:

$$\delta z = \begin{bmatrix} \rho_{BDS,1} \\ \vdots \\ \rho_{BDS,m} \\ \rho_{GPS,1} \\ \vdots \\ \rho_{GPS,n} \\ \rho_{GLO,1} \\ \vdots \\ \rho_{GLO,p} \\ \rho_{GAL,1} \\ \vdots \\ \rho_{GAL,q} \end{bmatrix} - \begin{bmatrix} \|r(t_{k+1}) - r^{GPS,1}\| + c \cdot dt^{GPS}(t_{k+1}) - c \cdot dt^{GPS,1} + \eta^{GPS,1} \\ \vdots \\ \|r(t_{k+1}) - r^{GPS,n}\| + c \cdot dt^{GPS}(t_{k+1}) - c \cdot dt^{GPS,n} + \eta^{GPS,n} \\ \|r(t_{k+1}) - r^{GLO,1}\| + c \cdot dt^{GLO}(t_{k+1}) - c \cdot dt^{GLO,1} + \eta^{GLO,1} \\ \vdots \\ \|r(t_{k+1}) - r^{GLO,p}\| + c \cdot dt^{GLO}(t_{k+1}) - c \cdot dt^{GLO,p} + \eta^{GLO,p} \\ \|r(t_{k+1}) - r^{GAL,1}\| + c \cdot dt^{GAL}(t_{k+1}) - c \cdot dt^{GAL,1} + \eta^{GAL,1} \\ \vdots \\ \|r(t_{k+1}) - r^{GAL,q}\| + c \cdot dt^{GAL}(t_{k+1}) - c \cdot dt^{GAL,q} + \eta^{GAL,q} \\ \|r(t_{k+1}) - r^{BDS,1}\| + c \cdot dt^{BDS}(t_{k+1}) - c \cdot dt^{BDS,1} + \eta^{BDS,1} \\ \vdots \\ \|r(t_{k+1}) - r^{BDS,m}\| + c \cdot dt^{BDS}(t_{k+1}) - c \cdot dt^{BDS,m} + \eta^{BDS,m} \end{bmatrix};$$

$$i = 1, 2, \ldots, N;$$

where $\delta Z$ represents the first prediction residual vector, $t_{k+1}$ represents the first moment, $r(t_{k+1})$ represents location information of the target vehicle at the first moment (the location information is derived from the satellite filtering parameters), $r^i$ represents a satellite location of an $i^{th}$ satellite (for example, $r^{GPS,1}$ represents the satellite location of the first GPS satellite, and $r^{GPS,n}$ represents the satellite location of the $n^{th}$ GPS satellite), c represents a value of the speed of light in vacuum, and $dt^i$ represents a clock skew of the $i^{th}$ satellite, and the above parameters may be calculated from the satellite real-time navigation ephemeris, that is, calculated from the broadcast ephemeris information at the first moment. $\eta^i$, i=1, 2, . . . , N represents the number of error corrections (including ionosphere, troposphere and S-earth rotation corrections), and the above parameters may be calculated by empirical models.

On this basis, the terminal device determines the first parameter correction amount corresponding to the target vehicle at the first moment according to the covariance matrix corresponding to the first moment, the first Jacobian matrix, the pseudo range measurement error matrix, the first gain matrix and the first prediction residual vector. That is, a calculation approach of the first parameter correction amount is:

$$\delta X(t_{k+1}) = \begin{bmatrix} \delta x(t_{k+1}) \\ \delta y(t_{k+1}) \\ \delta z(t_{k+1}) \\ \delta v_x(t_{k+1}) \\ \delta v_y(t_{k+1}) \\ \delta v_z(t_{k+1}) \\ \delta dt^{GPS}(t_{k+1}) \\ \delta dt^{GLO}(t_{k+1}) \\ \delta dt^{GAL}(t_{k+1}) \\ \delta dt^{BDS}(t_{k+1}) \\ \delta dtr(t_{k+1}) \end{bmatrix} = \underbrace{P(t_{k+1}) \cdot H^T \left(H \cdot P(t_{k+1}) \cdot H^T + R_\rho(t_{k+1})\right)^{-1}}_{K(t_{k+1})} \cdot \delta z;$$

where $\delta X(t_{k+1})$ represents a first parameter correction amount corresponding to the target vehicle at the first moment, $P(t_{k+1})$ represents a covariance matrix corresponding to the first moment, H represents a first Jacobian matrix, $R_\rho(t_{k+1})$ represents a pseudo range measurement error matrix corresponding to the first moment (directly obtained by the satellite positioning device), $\delta Z$ represents a first prediction residual vector, and $K(t_{k+1})$ represents a first gain matrix corresponding to the first moment.

Specifically, the first Jacobian matrix is determined based on the N unit observation vectors, each unit observation vector is used for representing a direction vector of a connecting line between the satellite and the target vehicle. The first Jacobian matrix is calculated by using the following approach:

$$H = \begin{bmatrix} -e^{GPS,1T} & 0_{1\times 3} & 1 & 0 & 0 & 0 & 0 \\ \vdots & & & & & & \\ -e^{GPS,nT} & 0_{1\times 3} & 1 & 0 & 0 & 0 & 0 \\ -e^{GLO,1T} & 0_{1\times 3} & 0 & 1 & 0 & 0 & 0 \\ \vdots & & & & & & \\ -e^{GLO,pT} & 0_{1\times 3} & 0 & 1 & 0 & 0 & 0 \\ -e^{GPS,1T} & 0_{1\times 3} & 0 & 0 & 1 & 0 & 0 \\ \vdots & & & & & & \\ -e^{GAL,qT} & 0_{1\times 3} & 0 & 0 & 1 & 0 & 0 \\ -e^{BDS,1T} & 0_{1\times 3} & 0 & 0 & 0 & 1 & 0 \\ \vdots & & & & & & \\ -e^{BDS,mT} & 0_{1\times 3} & 0 & 0 & 0 & 1 & 0 \end{bmatrix};$$

$$\sigma_{\rho i} = \left(5 \cdot 10^{\frac{45-CN0}{10}}\right)^2, i = 1, 2, \ldots, N;$$

$$R_\rho(t_{k+1}) = \begin{bmatrix} \sigma_{\rho 1} & \cdots & 0 \\ \vdots & \ddots & \vdots \\ 0 & \cdots & \sigma_{\rho N} \end{bmatrix};$$

$$r(t_{k+1}) = \begin{bmatrix} x(t_{k+1}) \\ y(t_{k+1}) \\ z(t_{k+1}) \end{bmatrix};$$

where H represents the first Jacobian matrix, $e^i$ represents a unit observation vector from an $i^{th}$ satellite to the target vehicle, which is a direction vector of a connecting line between the two space points, namely, the satellite and the terminal device, $\sigma_{\rho i}$ represents a variance value of the measurement noise, CN0 represents a carrier-to-noise ratio of the $i^{th}$ satellite, $r(t_{k+1})$ represents location information of the target vehicle at the first moment, $x(t_{k+1})$ represents the x-axis coordinate of the target vehicle at the first moment, $y(t_{k+1})$ represents the y-axis coordinate of the target vehicle at the first moment, and $z(t_{k+1})$ represents the z-axis coordinate of the target vehicle at the first moment. Furthermore, the calculation approach of $e^i$ is as follows:

$$e^i = \frac{r^i(t_{k+1}) - r(t_{k+1})}{\|r^i(t_{k+1}) - r(t_{k+1})\|};$$

where $r^i$ represents a satellite location of the $i^{th}$ satellite, and $r(t_{k+1})$ represents the location information of the target vehicle at the first moment.

During the obtaining of the first parameter correction amount $\delta X(t_{k+1})$, the satellite filtering parameter $X(t_{k+1})$ is updated satellite filtering parameters of the target vehicle at the first moment, that is, the updated satellite filtering parameters are obtained by using the following approach:

$$\overline{X}(t_{k+1}) = X(t_{k+1}) + \delta X(t_{k+1});$$

where $\overline{X}(t_{k+1})$ represents the positioning information of the target vehicle at the first moment, $X(t_{k+1})$ represents the satellite filtering parameter, and $\delta X(t_{k+1})$ represents the target parameter correction amount corresponding to the target vehicle at the first moment.

In addition, the covariance matrix of the filtering parameter may also be updated by using the following approach:

$$\overline{P}(t_{k+1}) = (I_{11\times11} - K(t_{k+1}) \cdot H) \cdot P(t_{k+1});$$

where $\overline{P}(t_{k+1})$ represents a target covariance matrix corresponding to the first moment, $I_{11\times11}$ represents a matrix of 11×11, H represents a first Jacobian matrix, $P(t_{k+1})$ represents the covariance matrix corresponding to the first moment, and $K(t_{k+1})$ represents the first gain matrix corresponding to the first moment.

In view of the above, the terminal device determines the updated satellite filtering parameters according to the target parameter correction amount and the satellite filtering parameters, and then determines the first parameter correction amount corresponding to the target vehicle at the first moment according to the target covariance matrix, the second Jacobian matrix, the Doppler measurement error matrix, the second gain matrix and the second prediction residual vector. Finally, the updated satellite filtering parameters are updated by using the first parameter correction amount, to obtain positioning information of the target vehicle at the first moment.

Secondly, in the embodiments of this disclosure, provided is an approach of determining the first parameter correction amount based on the pseudo range observation value and the Doppler observation value. Through the approach above, the satellite filtering parameters are corrected by using the pseudo range observation value and the Doppler observation value. The pseudo range observation value and the Doppler observation value determined based on satellite ephemeris have higher reliability. Therefore, satellite positioning assistance may enhance the accuracy of satellite positioning in weak satellite signal scenarios, thereby improving the accuracy of vehicle positioning information.

Based on the embodiment corresponding to FIG. 3, in another embodiment provided by the embodiments of this disclosure, the terminal device determines a first parameter correction amount corresponding to the target vehicle at the first moment according to the target covariance matrix, which may specifically include the following steps:

The terminal device obtains a second Jacobian matrix corresponding to N unit observation vectors, each unit observation vector included in the N unit observation vectors representing a direction vector of a connecting line between the satellite and the target vehicle.

The terminal device obtains a Doppler measurement error matrix corresponding to the first moment.

The terminal device obtains a second gain matrix corresponding to the first moment.

The terminal device determines a second prediction residual vector according to the satellite filtering parameters and the Doppler observation value corresponding to the first moment.

The terminal device determines the first parameter correction amount corresponding to the target vehicle at the first moment according to the target covariance matrix, the second Jacobian matrix, the Doppler measurement error matrix, the second gain matrix and the second prediction residual vector.

The terminal device updates the satellite filtering parameters by using the first parameter correction amount, to obtain positioning information of the target vehicle at the first moment, which may specifically include the following steps:

The terminal device determines updated satellite filtering parameters according to the target parameter correction amount and the satellite filtering parameters, the updated satellite filtering parameters including updated speed information and updated location information corresponding to the target vehicle at the first moment.

The terminal device updates the updated satellite filtering parameters by using the first parameter correction amount, to obtain positioning information of the target vehicle at the first moment.

In this embodiment, an approach of determining the first parameter correction amount based on the pseudo range observation value and the Doppler observation value is introduced. Combined with the introduction above, in response to calculating the first parameter correction amount of the target vehicle at the first moment, it is necessary to obtain the Doppler observation value. Assuming that at the first moment $t_{k+1}$, the terminal device receives the Doppler observation values of N satellite signals fed back by the satellite positioning device, the pseudo range observation values are represented as: $\dot{\rho}_i$, i=1,2,3, ..., N.

In this case, the terminal device determines a second prediction residual vector according to the satellite filtering parameters and the Doppler observation value corresponding to the first moment, that is, the second prediction residual vector is calculated in the following manner:

$$\delta \check{z} = \begin{bmatrix} \dot{\rho}_1 - ((v^1 - v(t_{k+1})) \cdot e^{1T} + dtr - c \cdot \dot{dt}^1(t_{k+1})) \\ \dot{\rho}_2 - ((v^2 - v(t_{k+1})) \cdot e^{2T} + dtr - c \cdot \dot{dt}^2(t_{k+1})) \\ \vdots \\ \dot{\rho}_N - ((v^N - v(t_{k+1})) \cdot e^{NT} + dtr - c \cdot \dot{dt}^N(t_{k+1})) \end{bmatrix};$$

where $\delta \check{Z}$ represents the second prediction residual vector, $t_{k+1}$ represents the first moment, $\dot{\rho}_i$, i=1, 2, 3, ..., N represents the pseudo range observation value, $v^i$ represents a speed of an $i^{th}$ satellite, $v(t_{k+1})$ represents speed information of the target vehicle at the first moment (the speed information is derived from the satellite filtering parameters), $r^i$ represents a satellite location of the $i^{th}$ satellite (for example, $r^{GPS,1}$ represents the satellite location of the first GPS satellite, and $r^{GPS,n}$ represents the satellite location of the $n^{th}$ GPS satellite), c represents a value of the speed of light in vacuum, dtr represents a clock skew change rate of the satellite positioning device, and $\dot{d}t^i(t_{k+1})$ represents a clock skew change rate of the $i^{th}$ satellite. The above parameters may be calculated by satellite real-time navigation ephemeris, that is, calculated from the broadcast ephemeris information at the first moment.

On this basis, the terminal device determines the first parameter correction amount corresponding to the target vehicle at the first moment according to the covariance matrix corresponding to the first moment, the second Jacobian matrix, the Doppler measurement error matrix, the second gain matrix and the second prediction residual vector. That is, a calculation approach of the first parameter correction amount is:

$$\delta \check{X}(t_{k+1}) = \underbrace{\overline{P}(t_{k+1}) \cdot M^T \left(M \cdot \overline{P}(t_{k+1}) \cdot M^T + R_{\dot{\rho}}(t_4)\right)^{-1}}_{\check{K}(t_4)} \cdot \delta \check{z};$$

where $\delta \check{X}(t_{k+1})$ represents a first parameter correction amount corresponding to the target vehicle at the first moment, $\overline{P}(t_{k+1})$ represents a covariance matrix corresponding to the first moment, M represents a second Jacobian matrix, $R_{\dot{\rho}}(t_4)$ represents a Doppler measurement error matrix corresponding to the first moment (directly obtained by the satellite positioning device), $\delta \check{Z}$ represents a second prediction residual vector, and $\check{K}(t_4)$ represents a second gain matrix corresponding to the first moment.

Specifically, the second Jacobian matrix is determined based on the N unit observation vectors, each unit observation vector is used for representing a direction vector of a connecting line between the satellite and the target vehicle. The second Jacobian matrix is calculated by using the following approach:

$$M = \begin{bmatrix} 0_{1 \times 3} & -e^{GPS,1T} & 0 & 0 & 0 & 0 & 1 \\ & \vdots & & & & & \\ 0_{1 \times 3} & -e^{GPS,nT} & 0 & 0 & 0 & 0 & 1 \\ 0_{1 \times 3} & -e^{GLO,1T} & 0 & 0 & 0 & 0 & 1 \\ & \vdots & & & & & \\ 0_{1 \times 3} & -e^{GLO,pT} & 0 & 0 & 0 & 0 & 1 \\ 0_{1 \times 3} & -e^{GAL,1T} & 0 & 0 & 0 & 0 & 1 \\ & \vdots & & & & & \\ 0_{1 \times 3} & -e^{GAL,qT} & 0 & 0 & 0 & 0 & 1 \\ 0_{1 \times 3} & -e^{BDS,1T} & 0 & 0 & 0 & 0 & 1 \\ & \vdots & & & & & \\ 0_{1 \times 3} & -e^{BDS,mT} & 0 & 0 & 0 & 0 & 1 \end{bmatrix}$$

$$R_{\dot{\rho}}(t_{k+1}) = \begin{bmatrix} \sigma_{\dot{\rho}1} & \cdots & 0 \\ \vdots & \ddots & \vdots \\ 0 & \cdots & \sigma_{\dot{\rho}N} \end{bmatrix};$$

$$\sigma_{\dot{\rho}i} = \left(0.3 \cdot 10^{\frac{45-CN0}{10}}\right)^2, i = 1, 2, \ldots, N;$$

$$v(t_{k+1}) = \begin{bmatrix} v_x(t_{k+1}) \\ v_y(t_{k+1}) \\ v_z(t_{k+1}) \end{bmatrix};$$

where M represents the second Jacobian matrix, $e^i$ represents a unit observation vector from an $i^{th}$ satellite to the target vehicle, which is a direction vector of a connecting line between the two space points, namely, the satellite and the terminal device, $\sigma_{\dot{\rho}i}$ represents a variance value of the measurement noise, CN0 represents a carrier-to-noise ratio of the $i^{th}$ satellite, $v(t_{k+1})$ represents speed information of the target vehicle at the first moment, $v_x(t_{k+1})$ represents the speed information of the target vehicle at the first moment in the x-axis direction, $v_y(t_{k+1})$ represents the speed information of the target vehicle at the first moment in the y-axis direction, and $v_z(t_{k+1})$ represents the speed information of the target vehicle at the first moment in the z-axis direction. Furthermore, the calculation approach of $e^i$ is as follows:

$$e^i = \frac{r^i(t_{k+1}) - r(t_{k+1})}{\|r^i(t_{k+1}) - r(t_{k+1})\|};$$

where $r^i$ represents a satellite location of the $i^{th}$ satellite, and $r(t_{k+1})$ represents the location information of the target vehicle at the first moment.

It is to be illustrated that in a case that the satellite filtering parameters include the speed information corresponding to the target vehicle at the first moment, but do not include the location information, the location information in the satellite filtering parameters is set to 0. It is to be understood that m, n, p, and q may be integers greater than or equal to 0, and the sum of m+n+p+q is equal to N, N being an integer greater than or equal to 1.

During the obtaining of the first parameter correction amount $\delta \check{X}(t_{k+1})$, the updated satellite filtering parameter $\check{X}(t_{k+1})$ is updated to obtain positioning information of the target vehicle at the first moment, that is, the positioning information is updated by using the following approach:

$$\check{X}(t_{k+1}) = \overline{X}(t_{k+1}) + \delta \check{X}(t_{k+1});$$

where $\overline{X}(t_{k+1})$ represents the positioning information of the target vehicle at the first moment, $\check{X}(t_{k+1})$ represents the updated satellite filtering parameter $\check{X}$, and $\delta \check{X}(t_{k+1})$ represents the first parameter correction amount corresponding to the target vehicle at the first moment.

In addition, the covariance matrix of the filtering parameter may also be updated by using the following approach:

$$\check{P}(t_{k+1}) = (I_{11 \times 11} - \check{K}(t_4) \cdot M) \cdot \overline{P}(t_{k+1});$$

where $\check{P}(t_{k+1})$ represents an updated covariance matrix at the first moment, $I_{11 \times 11}$ represents a matrix of 11×11, M represents a second Jacobian matrix, $\overline{P}(t_{k+1})$ represents the covariance matrix corresponding to the first moment, and $\check{K}(t_4)$ represents the second gain matrix corresponding to the first moment.

It is to be illustrated that the parameter correction amount (e.g., the first parameter correction amount) is used for correcting the location information and the speed information of the target vehicle, and the covariance matrix represents the accuracy of the location information and the speed information of the target vehicle.

Then, in the embodiments of this disclosure, provided is an approach of determining the first parameter correction amount based on the pseudo range observation value and the Doppler observation value. Through the approach above, the satellite filtering parameters are corrected by using the pseudo range observation value and the Doppler observation value. The pseudo range observation value and the Doppler observation value determined based on satellite ephemeris have higher reliability. Therefore, satellite positioning assistance may enhance the accuracy of satellite positioning in weak satellite signal scenarios, thereby improving the accuracy of vehicle positioning information.

Based on the embodiment corresponding to FIG. 3, in another embodiment provided by this disclosure, the terminal device updates the positioning information at the first moment by using the second parameter correction amount, to obtain positioning information of the target vehicle at the second moment, which may specifically include the following steps:

The terminal device updates the positioning information at the first moment by using the second parameter correction amount, to obtain to-be-processed positioning information.

The terminal device determines first positioning information according to the positioning information at the first moment and a first weight value.

The terminal device determines second positioning information according to the to-be-processed positioning information and a second weight value.

The terminal device determines the positioning information of the target vehicle at the second moment according to the first positioning information and the second positioning information.

In this embodiment, an approach of updating positioning information is introduced. The terminal device may update the positioning information at the first moment by using the second parameter correction amount, for example, the second parameter correction amount and the positioning information at the first moment are added, to obtain to-be-processed positioning information of the target vehicle at the second moment.

Specifically, the terminal device may also calculate the positioning information at the first moment by using the first weight value. Assuming that the first weight value is 0.1, the positioning information at the first moment (including the speed information and the location information) is multiplied by the first weight value, to obtain the corresponding first positioning information. Similarly, the terminal device may also calculate the to-be-processed positioning information at the second moment by using the second weight value. Assuming that the second weight value is 0.9, the to-be-processed positioning information at the second moment (including the speed information and the location information) is multiplied by the second weight value, to obtain the corresponding second positioning information. The first positioning information and the second positioning information are added, to obtain the positioning information of the target vehicle at the second moment.

It is to be illustrated that the first weight value and the second weight value may be adjusted according to the actual situations, which is only an illustration here, and may not be construed as a limitation of this disclosure.

Secondly, in the embodiments of this disclosure, an approach of updating the positioning information is provided. Through the above approach, the positioning information calculated based on the Doppler observation value and the pseudo range observation value and the positioning information calculated based on the constraint matrix are assigned corresponding weight values according to a certain proportion, so as to adjust the confidence of the positioning information, thereby improving the reliability of the solution.

Based on the embodiment corresponding to FIG. 3, in another embodiment provided by the embodiments of this disclosure, the satellite filtering parameters include the location information and the speed information corresponding to the target vehicle at the first moment.

During the terminal device obtains a motion state of the target vehicle at a second moment, the method may further include the following steps:

The terminal device obtains a location confidence factor and a speed confidence factor corresponding to the satellite filtering parameters, the location confidence factor representing location accuracy of the target vehicle, and the speed confidence factor representing speed accuracy of the target vehicle.

The terminal device obtains a number of visible satellites.

The terminal device determines to execute the step of obtaining a motion state of the target vehicle at a second moment in a case that the location confidence factor, the speed confidence factor and the number of visible satellites satisfy a vehicle constraint condition.

In this embodiment, an approach of determining whether to execute positioning constraints based on the location confidence factor, the speed confidence factor and the number of visible satellites is introduced. The terminal device may obtain the location information and speed information corresponding to the target vehicle at a certain moment, and further obtain the location confidence factor of the location information and the speed confidence factor of the speed information. In addition, the terminal device may detect the number of visible satellites.

The location confidence factor and the speed confidence factor may be determined according to the scenarios. Assuming that the value range of the location confidence factor and the speed confidence factor is 0 to 1. The larger the value is, the higher the confidence is. The location confidence factor and the speed confidence factor are related to the scenario where the target vehicle is located. For example, in lane-level navigation, the location confidence factor and the speed confidence factor are both 0.3, and in map navigation, the location confidence factor and the speed confidence factor are both 0.5. It is to be illustrated that the above scenario is only an illustration. In practical applications, the location confidence factor and the speed confidence factor may also be flexibly defined based on other scenarios.

Specifically, in a case that the location confidence factor is greater than or equal to a first threshold, the speed confidence factor is greater than or equal to a second threshold, and the number of visible satellites is greater than or equal to a third threshold, the vehicle constraints are satisfied. Conversely, in a case that the location confidence factor is smaller than the first threshold, or the speed confidence factor is smaller than the second threshold, or the number of visible satellites is smaller than the third threshold, the vehicle constraints are not satisfied.

It is to be understood that the first threshold may be set to 0.5, the second threshold may be set to 0.6, and the third threshold may be set to 6. The first threshold, the second threshold and the third threshold may be flexibly set according to the actual situations. It is only an illustration and may not be construed as a limitation to this disclosure.

Secondly, in the embodiments of this disclosure, an approach of determining whether to execute the positioning constraints based on the location confidence factor, the speed confidence factor and the number of visible satellites is provided. The above approach provides certain restrictions for the positioning constraints. On the one hand, the accuracy of the positioning constraints may be improved, and on the other hand, in the case where the vehicle constraints are not satisfied, subsequent calculations are not performed, thereby saving computing resources.

Based on the embodiment corresponding to FIG. 3, in another embodiment provided by the embodiments of this disclosure, the terminal device obtains a motion state of the target vehicle at the second moment, which may specifically include the following steps:

The terminal device obtains a first in-vehicle image through an image acquisition apparatus.

The terminal device obtains a second in-vehicle image through the image acquisition apparatus, the second in-vehicle image and the first in-vehicle image being two adjacent image frames;

The terminal device performs feature point matching on the first in-vehicle image and the second in-vehicle image.

The terminal device determines the motion state of the target vehicle at the second moment according to a feature point matching result.

In this embodiment, an approach of determining a vehicle driving state based on an in-vehicle image is introduced. The terminal device captures continuous in-vehicle images through the image acquisition apparatus, then performs feature point matching on two adjacent in-vehicle image frames in the in-vehicle images, and determines whether the vehicle is stationary or in a straight motion state according to the change of the location coordinates of the matched image feature points in the image coordinate system.

Figure 8:
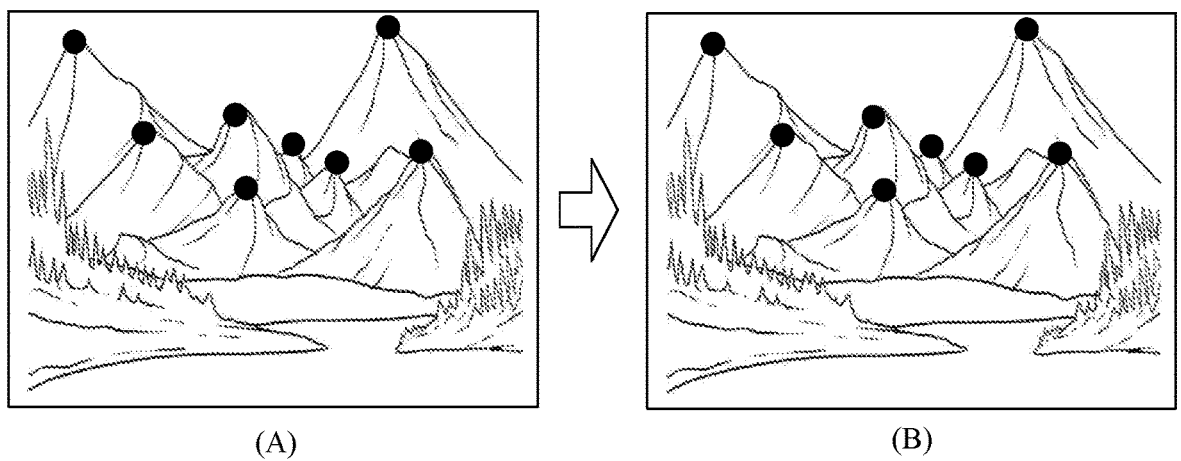
FIG. 8 is a schematic diagram of determining a vehicle motion state based on an in-vehicle image according to an embodiment of this disclosure.

Specifically, for the convenience of introduction, reference is made to FIG. 8. FIG. 8 is a schematic diagram of determining a vehicle motion state based on an in-vehicle image according to an embodiment of this disclosure. As shown in (A) of FIG. 8, a first in-vehicle image has eight feature points. As shown in (B) of FIG. 8, a second in-vehicle image has eight feature points. In a case that the eight feature points in the first in-vehicle image and the eight feature points in the second in-vehicle image are not offset, or the offset is less than a preset value (for example, 10 pixels), the target vehicle is considered to be in a stationary state. The situation as shown in FIG. 8 may be understood as that the target vehicle is in a stationary state.

Figure 9:
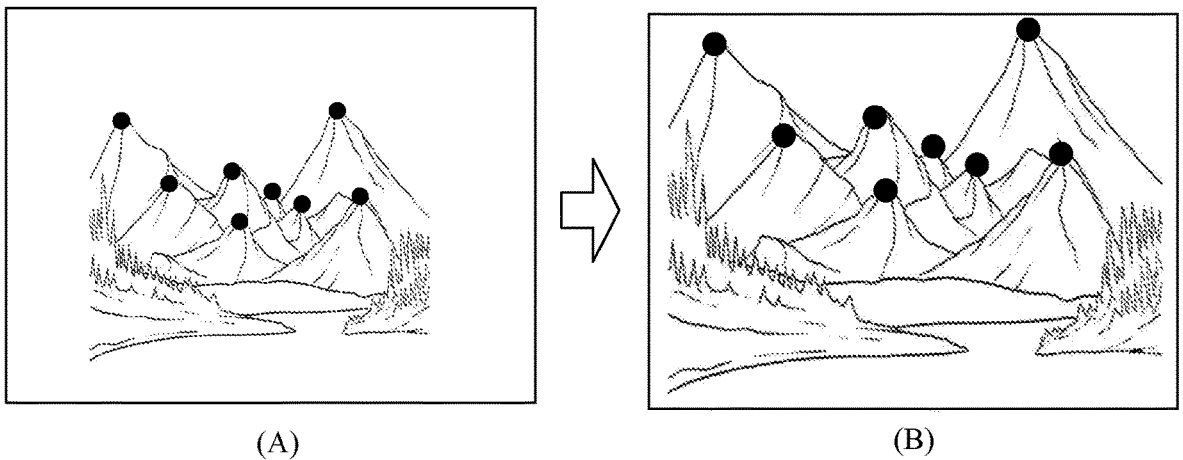
FIG. 9 is another schematic diagram of determining a vehicle motion state based on an in-vehicle image according to an embodiment of this disclosure.

Reference is made to FIG. 9. FIG. 9 is another schematic diagram of determining a vehicle motion state based on an in-vehicle image according to an embodiment of this disclosure. As shown in (A) of FIG. 9, a first in-vehicle image has eight feature points. As shown in (B) of FIG. 9, a second in-vehicle image has eight feature points. In a case that the eight feature points in the first in-vehicle image and the eight feature points in the second in-vehicle image are offset, and an offset direction is convergence or divergence, the target vehicle is considered to be in a straight motion state. The situation as shown in FIG. 9 may be understood as that the target vehicle is in a straight motion state.

Secondly, in the embodiments of this disclosure, an approach of determining the vehicle driving state based on the in-vehicle image is provided. Through the above approach, the current driving state of the target vehicle may be determined, which is convenient for subsequent processing, thereby improving the feasibility and operability of the solution.

Based on the embodiment corresponding to FIG. 3, in another embodiment provided by the embodiments of this disclosure, the terminal device obtains a motion state of the target vehicle at the second moment, which may specifically include the following steps:

The terminal device determines the motion state of the target vehicle at the second moment according to steering wheel position information corresponding to the target vehicle;

or, the terminal device determines the motion state of the target vehicle at the second moment based on a road network matching result.

In this embodiment, an approach of determining a vehicle driving state based on the steering wheel position information and the road network matching result is introduced. These are respectively described in the following.

Figure 10:
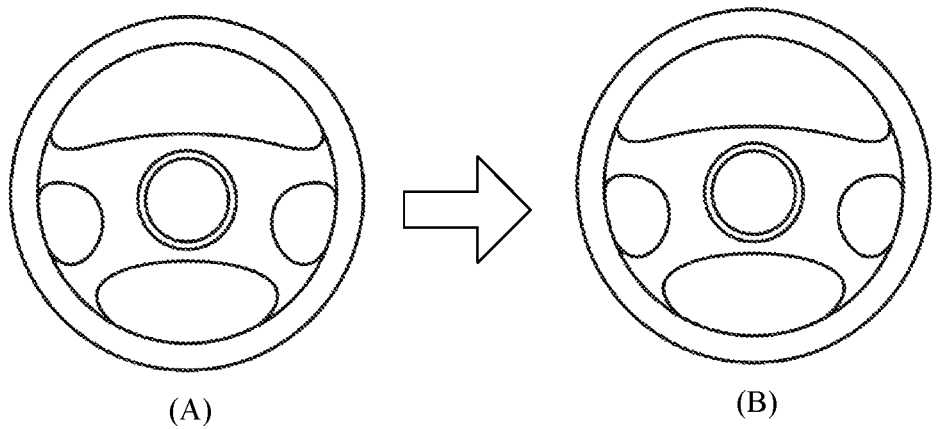
FIG. 10 is a schematic diagram of determining a vehicle motion state based on steering wheel position information according to an embodiment of this disclosure.

1. Determining the vehicle driving state based on the steering wheel position information;

Specifically, for the convenience of introduction, reference is made to FIG. 10. FIG. 10 is a schematic diagram of determining a vehicle motion state based on steering wheel position information according to an embodiment of this disclosure. As shown in (A) of FIG. 10, in a case that the steering wheel of the target vehicle is aligned, the steering wheel position information is 0 degree. In a case that there is a deflection, the steering wheel position information is changed according to an angle change. For example, in a case that it is turned 5 degrees to the left, the steering wheel position information is −5 degrees. For another example, in a case that it is turned 5 degrees to the right, then the steering wheel position information is 5 degrees. As shown in (B) of FIG. 10, in this case, the steering wheel position information is 0 degree, thereby determining that the target vehicle is in a stationary state or a straight motion state.

Figure 11:
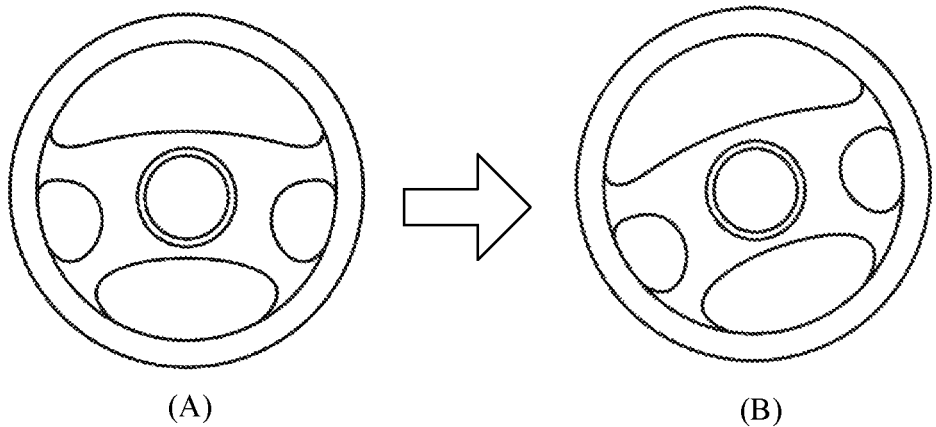
FIG. 11 is another schematic diagram of determining a vehicle motion state based on steering wheel position information according to an embodiment of this disclosure.

Reference is made to FIG. 11. FIG. 11 is another schematic diagram of determining a vehicle motion state based on steering wheel position information according to an embodiment of this disclosure. As shown in (A) of FIG. 11, in a case that the steering wheel of the target vehicle is aligned, the steering wheel position information is 0 degree. Assuming that the steering wheel is turned 5 degrees to the left, i.e., the situation as shown in (B) of FIG. 11, the steering wheel position information is −5 degrees. Hence, it is determined that the target vehicle is in a non-stationary state and is also in a non-straight motion state.

It is to be understood that, in combination with the throttle condition or the odometer, etc., whether it is a straight motion state or a stationary state may be further determined.

2. Determining the vehicle driving state based on the road network matching result;

Specifically, Road network matching may be understood as map matching. First, a driving trajectory of the target vehicle is obtained, and then the location of the target vehicle is determined based on Location Based Services (LBS), and then the road network matching result is obtained by matching according to the map data.

It is to be understood that the LBS is a location-related service provided by wireless operators for users. Based on the LBS, various types of positioning technologies are used for obtaining the current location of the positioning device, and information resources and basic services are provided to the positioning device through the mobile Internet. The LBS service integrates various information technologies such as mobile communication, Internet, spatial positioning, location information and big data, and performs data update and interaction by using a mobile Internet service platform, so that the users may obtain corresponding services through spatial positioning.

Secondly, in the embodiments of this disclosure, an approach of determining the vehicle driving state based on the steering wheel position information and the road network matching result is provided. Through the above approach, the current driving state of the target vehicle may be determined, which is convenient for subsequent processing, thereby improving the feasibility and operability of the solution.

Based on the embodiment corresponding to FIG. 3, in another embodiment provided by the embodiments of this disclosure, after the obtaining a motion state of the target vehicle at the second moment, the method may also include the following step:

The terminal device determines that the motion state of the target vehicle at the second moment satisfies the positioning correction condition in a case that the motion state of the target vehicle at the second moment is a stationary state.

The terminal device obtains a constraint matrix corresponding to the motion state, which may specifically include the following step:

The terminal device constructs a constraint matrix corresponding to the stationary state.

The terminal device determines a second parameter correction amount corresponding to the target vehicle at the second moment according to the constraint matrix corresponding to the motion state, which may specifically include the following steps:

The terminal device obtains a covariance matrix corresponding to the second moment.

The terminal device obtains a first measurement error variance matrix.

The terminal device obtains a speed matrix corresponding to the second moment.

The terminal device obtains a third gain matrix corresponding to the second moment.

The terminal device determines the second parameter correction amount corresponding to the target vehicle at the second moment according to the covariance matrix corresponding to the second moment, the constraint matrix corresponding to the stationary state, the first measurement error variance matrix, the speed matrix corresponding to the second moment, and the third gain matrix.

In this embodiment, an approach of constructing a vehicle stationary state constraint to assist in satellite positioning is introduced. Assuming that the current moment is the second moment, the second moment is expressed as $t_{p+1}$, and the moment before the second moment is $t_p$. In a case that the target vehicle is in a stationary state within a time interval between a moment $t_p$ and a moment $t_{p+1}$, the positioning information $X(t_{p+1})$ at the first moment corresponding to the second moment and the covariance matrix $P(t_{p+1})$ corresponding to the second moment may be obtained at this time.

Specifically, the second parameter correction amount is calculated by using the following approach:

$$\delta X_0 = (t_{p+1}) = \underbrace{P(t_{p+1}) \cdot V^T \left( V \cdot P(t_{p+1}) \cdot V^T + R_0(t_{p+1}) \right)^{-1}}_{K_0(t_{p+1})} \cdot \delta z_0;$$

where $\delta X_0(t_{p+1})$ represents a second parameter correction amount corresponding to the target vehicle at the second moment, $P(t_{p+1})$ represents a covariance matrix corresponding to the second moment, V represents a constraint matrix corresponding to the stationary state, $R_0(t_{p+1})$ represents a first measurement error variance matrix corresponding to the second moment, $K_0(t_{p+1})$ represents a third gain matrix corresponding to the second moment, and $\delta z_0$ represents a speed matrix corresponding to the second moment.

On this basis, the speed matrix corresponding to the second moment is specifically expressed as:

$$\delta z_0 = \begin{bmatrix} v_x(t_{p+1}) \\ v_y(t_{p+1}) \\ v_z(t_{p+1}) \end{bmatrix};$$

where $\delta z_0$ represents a speed matrix corresponding to the second moment, $v_x(t_{p+1})$ represents speed information of the target vehicle at the second moment in the x-axis direction, $v_y(t_{p+1})$ represents speed information of the target vehicle at the second moment in the y-axis direction, $v_z(t_{p+1})$ represents speed information of the target vehicle at the second moment in the z-axis direction.

On this basis, the constraint matrix corresponding to the stationary state is specifically expressed as:

$$V = \begin{bmatrix} 0 & 0 & 0 & 1 & 0 & 0 & 0 & 0 & 0 & 0 & 0 \\ 0 & 0 & 0 & 0 & 1 & 0 & 0 & 0 & 0 & 0 & 0 \\ 0 & 0 & 0 & 0 & 0 & 1 & 0 & 0 & 0 & 0 & 0 \end{bmatrix};$$

where V represents the constraint matrix corresponding to the stationary state.

On this basis, the first measurement error variance matrix corresponding to the second moment is specifically expressed as:

$$R_0(t_{p+1}) = \begin{bmatrix} 1.0^2 & 0 & 0 \\ 0 & 1.0^2 & 0 \\ 0 & 0 & 1.0^2 \end{bmatrix};$$

where $R_0(t_{p+1})$ represents the first measurement error variance matrix corresponding to the second moment.

Combined with the introduction above, the terminal device updates the positioning information at the first moment by using the second parameter correction amount, to obtain positioning information of the target vehicle at the second moment. That is, the positioning information of the target vehicle at the second moment is calculated by using the following approach:

$$\hat{X}(t_{p+1}) = X(t_{p+1}) + \delta X_0(t_{p+1});$$

where $\hat{X}(t_{p+1})$ represents the positioning information of the target vehicle at the second moment, $X(t_{p+1})$ represents the positioning information of the target vehicle at the second moment, and $\delta X_0(t_{p+1})$ represents the second parameter correction amount.

The covariance matrix of the filtering parameter may also be updated by using the following approach:

$$\hat{P}(t_{p+1}) = (I_{11 \times 11} - K_0(t_{p+1}) \cdot V) \cdot P(t_{p+1});$$

where $\hat{P}(t_{p+1})$ represents an updated covariance matrix at the second moment, $I_{11 \times 11}$ represents a matrix of 11×11, V represents the constraint matrix corresponding to the stationary state, $P(t_{p+1})$ represents the covariance matrix corresponding to the second moment, and $K_0(t_{p+1})$ represents the third gain matrix corresponding to the second moment.

So far, the update of the vehicle stationary state constraints is completed, and the updated positioning information $\hat{X}(t_{p+1})$ and the updated $\hat{P}(t_{p+1})$ are obtained.

Furthermore, in the embodiments of this disclosure, provided is an approach of constructing a vehicle stationary state constraint to assist in satellite positioning. Through the approach above, constructing a reasonable constraint may improve the positioning accuracy in a case that the vehicle is stationary.

Based on the embodiment corresponding to FIG. 3, in another embodiment provided by the embodiments of this disclosure, after the terminal device obtains a motion state of the target vehicle at the second moment, the method may also include the following step:

The terminal device determines that the motion state of the target vehicle at the second moment satisfies the positioning correction condition in a case that the motion state of the target vehicle at the second moment is a straight driving state.

The terminal device obtains a constraint matrix corresponding to the motion state, which may specifically include the following step:

The terminal device constructs a constraint matrix corresponding to the straight driving state.

The terminal device determines a second parameter correction amount corresponding to the target vehicle at the second moment according to the constraint matrix corresponding to the motion state, which may specifically include the following steps:

The terminal device obtains a covariance matrix corresponding to the second moment.

The terminal device obtains a second measurement error variance matrix.

The terminal device obtains a motion direction difference, the motion direction difference being a difference between a motion direction of the target vehicle at the second moment and a motion direction of the target vehicle at a third moment, and the third moment being a moment before the second moment.

The terminal device obtains a fourth gain matrix corresponding to the second moment.

The terminal device determines the second parameter correction amount corresponding to the target vehicle at the second moment according to the covariance matrix corresponding to the second moment, the constraint matrix corresponding to the straight driving state, the second measurement error variance matrix, the motion direction difference, and the fourth gain matrix.

In this embodiment, an approach of constructing a vehicle straight motion state constraint to assist in satellite positioning is introduced. Assuming that the current moment is the second moment, the second moment is expressed as $t_{p+1}$, and the moment before the second moment is $t_p$. In a case that the target vehicle is in a stationary state within a time interval between a moment $t_p$ and a moment $t_{p+1}$, the positioning information $X(t_{p+1})$ at the first moment corresponding to the second moment and the covariance matrix $P(t_{p+1})$ corresponding to the second moment may be obtained at this time, and at the moment $t_p$, the speed of the target vehicle is:

$$v(t_p) = \begin{bmatrix} v_x(t_p) \\ v_y(t_p) \\ v_z(t_p) \end{bmatrix};$$

where $v(t_p)$ represents a speed of the target vehicle at the moment $t_p$, $v_x(t_p)$ represents speed information of the target vehicle at the moment $t_p$ in the x-axis direction, $v_y(t_p)$ represents speed information of the target vehicle at the moment $t_p$ in the y-axis direction, $v_z(t_p)$ represents speed information of the target vehicle at the moment $t_p$ in the z-axis direction.

Therefore, it may be obtained that the motion direction $\theta_{t_p}$ of the target vehicle at the moment $t_p$ satisfies the following relational expression:

$$\tan(\theta_{t_p}) = \frac{-\sin\lambda \cdot v_x(t_p) + \cos\lambda \cdot v_y(t_p)}{-\sin\phi\cos\lambda \cdot v_x(t_p) - \sin\phi\sin\lambda \cdot v_y(t_p) + \cos\phi \cdot v_z(t_p)};$$

where $\theta_{t_p}$ represents the motion direction of the target vehicle at the moment $t_p$, $\lambda$ represents the longitude of the terminal device, and $\phi$ represents the latitude of the terminal device.

At the moment $t_{p+1}$, the motion speed of the vehicle is expressed as:

$$v(t_{p+1}) = \begin{bmatrix} v_x(t_{p+1}) \\ v_y(t_{p+1}) \\ v_z(t_{p+1}) \end{bmatrix};$$

where $v(t_{p+1})$ represents a speed of the target vehicle at the moment $(t_{p+1})$ (i.e., the second moment), $v_x(t_{p+1})$ represents speed information of the target vehicle at the moment $(t_{p+1})$ (i.e., the second moment) in the x-axis direction, $v_y(t_{p+1})$ represents speed information of the target vehicle at the moment $(t_{p+1})$ (i.e., the second moment) in the y-axis direction, $v_z(t_{p+1})$ represents speed information of the target vehicle at the moment $(t_{p+1})$ (i.e., the second moment) in the z-axis direction.

At the moment $(t_{p+1})$ (i.e., the second moment), the motion direction $\theta_{t_{p+1}}$ of the target vehicle also satisfies the following relational expression, namely:

$$\tan(\theta_{t_{p+1}}) = \frac{-\sin\lambda \cdot v_x(t_{p+1}) + \cos\lambda \cdot v_y(t_{p+1})}{-\sin\phi\cos\lambda \cdot v_x(t_{p+1}) - \sin\phi\sin\lambda \cdot v_y(t_{p+1}) + \cos\phi \cdot v_z(t_{p+1})}$$

where $\theta_{t_{p+1}}$ represents the motion direction of the target vehicle at the moment $(t_{p+1})$ (i.e., the second moment), $\lambda$ represents the longitude of the terminal device, and $\phi$ represents the latitude of the terminal device.

Since the vehicle moves in a straight line, theoretically, the following constraint equation of the vehicle's straight motion is satisfied:

$$\tan(\theta_{t_{p+1}}) = \tan(\theta_{t_p});$$

specifically, the second parameter correction amount is calculated by using the following approach:

$$\delta X_L(t_{p+1}) = \underbrace{P(t_{p+1}) \cdots G^T \left(G \cdot P(t_{p+1}) \cdot G^T + R_L(t_{p+1})\right)^{-1}}_{K_L(t_{p+1})} \cdot \delta z_L;$$

where $\delta X_L(t_{p+1})$ represents a second parameter correction amount corresponding to the target vehicle at the second moment, $P(t_{p+1})$ represents a covariance matrix corresponding to the second moment, G represents a constraint matrix corresponding to the straight driving state, $R_L(t_{p+1})$ represents a second measurement error variance matrix corresponding to the second moment, $K_L(t_{p+1})$ represents a fourth gain matrix corresponding to the second moment, and $\delta z_L$ represents a motion direction difference.

On this basis, the motion direction difference is specifically expressed as:

$$\delta z_L = [\tan(\theta_{t_{p+1}}) - \tan(\theta_{t_p})];$$

On this basis, the constraint matrix corresponding to the straight driving state is specifically expressed as:

$$G = [0\ 0\ 0\ J_{vx}\ J_{vy}\ J_{vz}\ 0\ 0\ 0\ 0\ 0];$$

$$J_{vx} = \frac{-\sin\lambda}{-\sin\phi\cos\lambda \cdot v_x(t_{p+1}) - \sin\phi\sin\lambda \cdot v_x(t_{p+1}) + \cos\phi \cdot v_z(t_{p+1})} - \frac{-\sin\phi\cos\lambda \cdot (-\sin\lambda \cdot v_x(t_{p+1}) + \cos\lambda \cdot v_y(t_{p+1}))}{(-\sin\phi\cos\lambda \cdot v_x(t_{p+1}) - \sin\phi\sin\lambda \cdot v_x(t_{p+1}) + \cos\phi \cdot v_z(t_{p+1}))^2}$$

$$J_{vy} = \frac{\cos\lambda}{-\sin\phi\cos\lambda \cdot v_x(t_{p+1}) - \sin\phi\sin\lambda \cdot v_x(t_{p+1}) + \cos\phi \cdot v_z(t_{p+1})} - \frac{-\sin\phi\sin\lambda \cdot (-\sin\lambda \cdot v_x(t_{p+1}) + \cos\lambda \cdot v_y(t_{p+1}))}{(-\sin\phi\cos\lambda \cdot v_x(t_{p+1}) - \sin\phi\sin\lambda \cdot v_x(t_{p+1}) + \cos\phi \cdot v_z(t_{p+1}))^2}$$

$$J_{vz} = -\frac{\cos\phi \cdot (-\sin\lambda \cdot v_x(t_{p+1}) + \cos\lambda \cdot v_y(t_{p+1}))}{(-\sin\phi\cos\lambda \cdot v_x(t_{p+1}) - \sin\phi\sin\lambda \cdot v_x(t_{p+1}) + \cos\phi \cdot v_z(t_{p+1}))^2}$$

where $J_{vx}$ represents a speed constraint in the x direction, $J_{vy}$ represents a speed constraint in the y direction, and $J_{vz}$ represents a speed constraint in the z direction.

On this basis, the second measurement error variance matrix corresponding to the second moment is specifically expressed as:

$$R_L(t_{p+1}) = \begin{bmatrix} 1.0^2 & 0 & 0 \\ 0 & 1.0^2 & 0 \\ 0 & 0 & 1.0^2 \end{bmatrix};$$

where $R_L(t_{p+1})$ represents the second measurement error variance matrix corresponding to the second moment.

Combined with the introduction above, the terminal device updates the positioning information at the first moment by using the second parameter correction amount, to obtain positioning information of the target vehicle at the second moment. That is, the positioning information of the target vehicle at the second moment is calculated by using the following approach:

$$\check{X}(t_{p+1}) = X(t_{p+1}) + \delta X_L(t_{p+1});$$

where $\check{X}(t_{p+1})$ represents the positioning information of the target vehicle at the second moment, $X(t_{p+1})$ represents the positioning information of the target vehicle at the second moment, and $\delta X_L(t_{p+1})$ represents the second parameter correction amount.

The covariance matrix of the filtering parameter may also be updated by using the following approach:

$$\check{P}(t_{p+1}) = (I_{11 \times 11} - K_L(t_{p+1}) \cdot G) \cdot P(t_{p+1});$$

where $\check{P}(t_{p+1})$ represents an updated covariance matrix at the second moment, represents a matrix of 11×11, G represents the constraint matrix corresponding to the straight driving state, $P(t_{p+1})$ represents the covariance matrix corresponding to the second moment, and $K_L(t_{p+1})$ represents the fourth gain matrix corresponding to the second moment.

So far, the update of the vehicle straight driving state constraints is completed, and the updated positioning information $\check{X}(t_{p+1})$ and the updated $\check{P}(t_{p+1})$ are obtained.

Furthermore, in the embodiments of this disclosure, provided is an approach of constructing a vehicle straight motion state constraint to assist in satellite positioning. Through the approach above, constructing a reasonable constraint may improve the positioning accuracy in the case of the vehicle straight motion.

Figure 12:
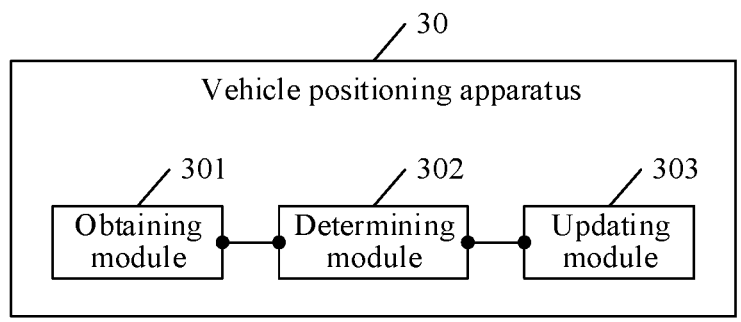
FIG. 12 is a schematic embodiment diagram of a vehicle positioning apparatus according to an embodiment of this disclosure.

The vehicle positioning apparatus in this disclosure is described in detail below, and reference is made to FIG. 12. FIG. 12 is a schematic diagram of an embodiment of a vehicle positioning apparatus according to an embodiment of this disclosure. The vehicle positioning apparatus 30 includes:

an obtaining module 301, configured to obtain satellite filtering parameters and to-be-processed data, the satellite filtering parameters including a clock skew and a clock skew change rate, and the satellite filtering parameters further including at least one of location information and speed information corresponding to a target vehicle at a first moment; and the to-be-processed data including at least one of a pseudo range observation value and a Doppler observation value corresponding to the target vehicle at the first moment;

a determining module 302, configured to determine a first parameter correction amount corresponding to the target vehicle at the first moment according to the satellite filtering parameters and the to-be-processed data;

an updating module 303, configured to update the satellite filtering parameters by using the first parameter correction amount, to obtain positioning information of the target vehicle at the first moment;

the obtaining module 301, further configured to obtain a motion state of the target vehicle at a second moment, the second moment being a moment after the first moment;

the obtaining module 301, further configured to obtain a constraint matrix corresponding to the motion state in a case that the motion state of the target vehicle at the second moment satisfies a positioning correction condition, the constraint matrix representing a positioning information variation satisfied in the motion state;

the determining module 302, configured to determine a second parameter correction amount corresponding to the target vehicle at the second moment according to the constraint matrix corresponding to the motion state; and the updating module 303, configured to update the positioning information at the first moment by using the second parameter correction amount, to obtain positioning information of the target vehicle at the second moment.

Based on the embodiment corresponding to FIG. 12, in another embodiment of the vehicle positioning apparatus 30 provided in the embodiments of this disclosure, the obtaining module 301 is specifically configured to:
transmit an ephemeris delivery request to a server, so that the server obtains broadcast ephemeris information corresponding to the first moment in response to the ephemeris delivery request, the broadcast ephemeris information including ephemeris parameters corresponding to N satellites, the N being an integer greater than or equal to 1;

receive the broadcast ephemeris information corresponding to the first moment transmitted by the server;

determine, according to the broadcast ephemeris information corresponding to the first moment, the satellite filtering parameters corresponding to the first moment; and obtain the to-be-processed data corresponding to the first moment through a satellite positioning device.

Based on the embodiment corresponding to FIG. 12, in another embodiment of the vehicle positioning apparatus 30 provided by the embodiments of this disclosure, the satellite filtering parameters include the location information corresponding to the target vehicle at the first moment, and the to-be-processed data includes the pseudo range observation value corresponding to the target vehicle at the first moment.

The determining module 302 is specifically configured to: obtain a covariance matrix corresponding to the first moment;
  obtain a first Jacobian matrix corresponding to N unit observation vectors, each unit observation vector included in the N unit observation vectors representing a direction vector of a connecting line between a satellite and the target vehicle;
  obtain a pseudo range measurement error matrix corresponding to the first moment;
  obtain a first gain matrix corresponding to the first moment;
  determine a first prediction residual vector according to the satellite filtering parameters and the pseudo range observation value corresponding to the first moment; and
  determine the first parameter correction amount corresponding to the target vehicle at the first moment according to the covariance matrix corresponding to the first moment, the first Jacobian matrix, the pseudo range measurement error matrix, the first gain matrix and the first prediction residual vector.

Based on the embodiment corresponding to FIG. 12, in another embodiment of the vehicle positioning apparatus 30 provided by the embodiments of this disclosure, the satellite filtering parameters include the speed information corresponding to the target vehicle at the first moment, and the to-be-processed data includes the Doppler observation value corresponding to the target vehicle at the first moment.

The determining module 302 is specifically configured to: obtain a covariance matrix corresponding to the first moment;
  obtain a second Jacobian matrix corresponding to N unit observation vectors, each unit observation vector included in the N unit observation vectors representing a direction vector of a connecting line between a satellite and the target vehicle;
  obtain a Doppler measurement error matrix corresponding to the first moment;
  obtain a second gain matrix corresponding to the first moment;
  determine a second prediction residual vector according to the satellite filtering parameters and the Doppler observation value corresponding to the first moment; and
  determine the first parameter correction amount corresponding to the target vehicle at the first moment according to the covariance matrix corresponding to the first moment, the second Jacobian matrix, the Doppler measurement error matrix, the second gain matrix and the second prediction residual vector.

Based on the embodiment corresponding to FIG. 12, in another embodiment of the vehicle positioning apparatus 30 provided by the embodiments of this disclosure, the satellite filtering parameters include the speed information and the location information corresponding to the target vehicle at the first moment, and the to-be-processed data includes the pseudo range observation value and the Doppler observation value corresponding to the target vehicle at the first moment.

The determining module 302 is specifically configured to: obtain a covariance matrix corresponding to the first moment;
  obtain a first Jacobian matrix corresponding to N unit observation vectors, each unit observation vector included in the N unit observation vectors representing a direction vector of a connecting line between a satellite and the target vehicle;
  obtain a pseudo range measurement error matrix corresponding to the first moment;
  obtain a first gain matrix corresponding to the first moment;
  determine a first prediction residual vector according to the satellite filtering parameters and the pseudo range observation value corresponding to the first moment;
  determine a target parameter correction amount corresponding to the target vehicle at the first moment according to the covariance matrix corresponding to the first moment, the first Jacobian matrix, the pseudo range measurement error matrix, the first gain matrix and the first prediction residual vector, the target parameter correction amount being used for updating the satellite filtering parameters;
  determine a target covariance matrix according to the covariance matrix corresponding to the first moment, the first gain matrix and the first Jacobian matrix; and
  determine a first parameter correction amount corresponding to the target vehicle at the first moment according to the target covariance matrix.

Based on the foregoing embodiment corresponding to FIG. 12, in another embodiment of the vehicle positioning apparatus 30 provided in the embodiments of this disclosure, the determining module 302 is specifically configured to:
  obtain a second Jacobian matrix corresponding to N unit observation vectors, each unit observation vector included in the N unit observation vectors representing a direction vector of a connecting line between a satellite and the target vehicle;
  obtain a Doppler measurement error matrix corresponding to the first moment;
  obtain a second gain matrix corresponding to the first moment;
  determine a second prediction residual vector according to the satellite filtering parameters and the Doppler observation value corresponding to the first moment; and
  determine the first parameter correction amount corresponding to the target vehicle at the first moment according to the target covariance matrix, the second Jacobian matrix, the Doppler measurement error matrix, the second gain matrix and the second prediction residual vector.

The updating the satellite filtering parameters by using the first parameter correction amount, to obtain positioning information of the target vehicle at the first moment includes:
  determining updated satellite filtering parameters according to the target parameter correction amount and the satellite filtering parameters, the updated satellite filtering parameters including updated speed information and updated location information corresponding to the target vehicle at the first moment; and
  updating the updated satellite filtering parameters by using the first parameter correction amount, to obtain positioning information of the target vehicle at the first moment.

Based on the foregoing embodiment corresponding to FIG. 12, in another embodiment of the vehicle positioning apparatus 30 provided in the embodiments of this disclosure, the updating module 303 is specifically configured to:
  update the positioning information at the first moment by using the second parameter correction amount, to obtain to-be-processed positioning information;

determine first positioning information according to the positioning information at the first moment and a first weight value;

determine second positioning information according to the to-be-processed positioning information and a second weight value; and determine the positioning information of the target vehicle at the second moment according to the first positioning information and the second positioning information.

Based on the embodiment corresponding to FIG. 12, in another embodiment of the vehicle positioning apparatus 30 provided by the embodiments of this disclosure, the satellite filtering parameters include the location information and the speed information corresponding to the target vehicle at the first moment.

The obtaining module 301 is further configured to obtain a location confidence factor and a speed confidence factor corresponding to the satellite filtering parameters before the obtaining of a motion state of the target vehicle at a second moment, the location confidence factor representing location accuracy of the target vehicle, and the speed confidence factor representing speed accuracy of the target vehicle.

The obtaining module 301 is further configured to obtain a number of visible satellites.

The determining module 302 is further configured to determine to execute the step of obtaining a motion state of the target vehicle at a second moment in a case that the location confidence factor, the speed confidence factor and the number of visible satellites satisfy a vehicle constraint condition.

Based on the foregoing embodiment corresponding to FIG. 12, in another embodiment of the vehicle positioning apparatus 30 provided in the embodiments of this disclosure, the obtaining module 301 is specifically configured to
obtain a first in-vehicle image through an image acquisition apparatus;
obtain a second in-vehicle image through the image acquisition apparatus, the second in-vehicle image and the first in-vehicle image being two adjacent image frames;
perform feature point matching on the first in-vehicle image and the second in-vehicle image; and
determine the motion state of the target vehicle at the second moment according to a feature point matching result.

Based on the foregoing embodiment corresponding to FIG. 12, in another embodiment of the vehicle positioning apparatus 30 provided in the embodiments of this disclosure, the obtaining module 301 is specifically configured to
determine the motion state of the target vehicle at the second moment according to steering wheel position information corresponding to the target vehicle;

or, determine the motion state of the target vehicle at the second moment based on a road network matching result.

Based on the foregoing embodiment corresponding to FIG. 12, in another embodiment of the vehicle positioning apparatus 30 provided in the embodiments of this disclosure, the determining module 302 is further configured to determine that the motion state of the target vehicle at the second moment satisfies the positioning correction condition in a case that the motion state of the target vehicle at the second moment is a stationary state during the obtaining module 301 obtains the motion state of the target vehicle at a second moment.

The obtaining module 301 is specifically configured to construct a constraint matrix corresponding to the stationary state.

The determining module 302 is specifically configured to:
obtain a covariance matrix corresponding to the second moment;
obtain a first measurement error variance matrix;
obtain a speed matrix corresponding to the second moment;
obtain a third gain matrix corresponding to the second moment; and
determine the second parameter correction amount corresponding to the target vehicle at the second moment according to the covariance matrix corresponding to the second moment, the constraint matrix corresponding to the stationary state, the first measurement error variance matrix, the speed matrix corresponding to the second moment, and the third gain matrix.

Based on the foregoing embodiment corresponding to FIG. 12, in another embodiment of the vehicle positioning apparatus 30 provided in the embodiments of this disclosure, the determining module 302 is further configured to determine that the motion state of the target vehicle at the second moment satisfies the positioning correction condition in a case that the motion state of the target vehicle at the second moment is a straight driving state during the obtaining module 301 obtains the motion state of the target vehicle at a second moment.

The obtaining module 301 is specifically configured to construct a constraint matrix corresponding to the straight driving state.

The determining module 302 is specifically configured to:
obtain a covariance matrix corresponding to the second moment;
obtain a second measurement error variance matrix;
obtain a motion direction difference, the motion direction difference being a difference between a motion direction of the target vehicle at the second moment and a motion direction of the target vehicle at a third moment, and the third moment being a moment before the second moment;
obtain a fourth gain matrix corresponding to the second moment; and
determine the second parameter correction amount corresponding to the target vehicle at the second moment according to the covariance matrix corresponding to the second moment, the constraint matrix corresponding to the straight driving state, the second measurement error variance matrix, the motion direction difference, and the fourth gain matrix.

Figure 13:
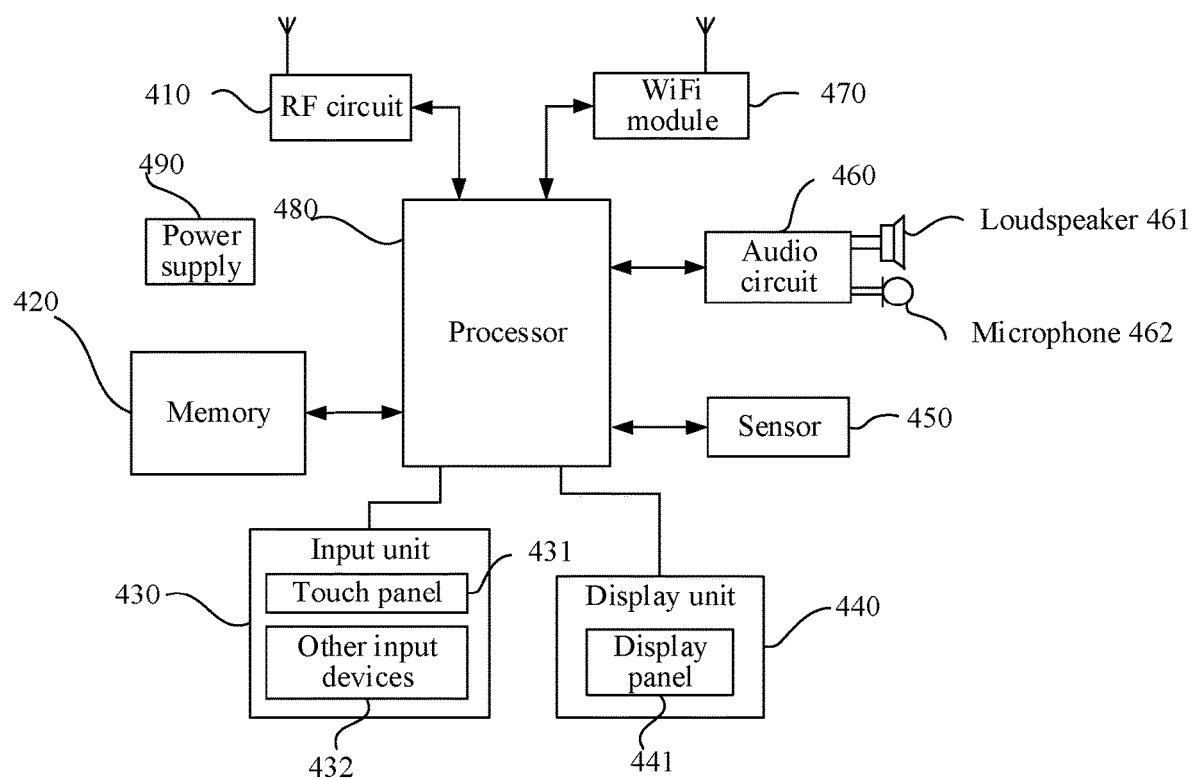
FIG. 13 is a schematic structural diagram of a terminal device according to an embodiment of this disclosure.

An embodiment of this disclosure further provides another vehicle positioning apparatus. As shown in FIG. 13, for ease of description, only parts related to the embodiments of this disclosure are shown. For specific technical details that are not disclosed, refer to the method part in the embodiments of this disclosure. In the embodiments of this disclosure, an example in which the terminal device is served as an in-vehicle terminal is used for description:

FIG. 13 is a block diagram of a part of a structure of an in-vehicle terminal related to a terminal device according to an embodiment of this disclosure. Referring to FIG. 13, the in-vehicle terminal includes: components such as a radio frequency (RF) circuit 410, a memory 420 (including a non-transitory computer-readable storage medium), an input unit 430, a display unit 440, a sensor 450, an audio circuit 460, a Wi-Fi module 370, a processor 480 (including processing circuitry), and a power supply 490. A person skilled in the art may understand that the structure of the in-vehicle terminal shown in FIG. 13 does not constitute a limitation on the in-vehicle terminal, and may include more or fewer components than shown, or combine some components, or have different component arrangements.

Each component part of the in-vehicle terminal is described below in detail with reference to FIG. 13.

The RF circuit 410 may be configured to receive and send a signal in an information receiving and sending process or a call process, and in particular, after downlink information of a base station is received, send the downlink information to the processor 480 for processing. In addition, the RF circuit sends uplink data to the base station. Usually, the RF circuit 410 includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communication standard or protocol, including but not limited to GSM, GPRS, CDMA, wideband code division multiple access (WCDMA), long term evolution (LTE), email, short messaging service (SMS), and the like.

The memory 420 may be configured to store a software program and module. The processor 480 runs the software program and module stored in the memory 420, to implement various functional applications and data processing of the in-vehicle terminal. The memory 420 may mainly include a program storage area and a data storage area. The program storage area may store an operating system, an application program required by at least one function (such as a sound playback function and an image display function), and the like. The data storage area may store data (for example, audio data and a phone book) created according to use of the in-vehicle terminal. In addition, the memory 420 may include a high-speed random access memory, and may further include a nonvolatile memory, such as at least one magnetic disk storage device, a flash memory, or another volatile solid-state storage device.

The input unit 430 may be configured to receive input digit or character information, and generate key signal input related to the user setting and function control of the in-vehicle terminal. Specifically, the input unit 430 may include a touch panel 431 and another input device 432. The touch panel 431, which may also be referred to as a touch screen, may collect a touch operation of a user on or near the touch panel (such as an operation of a user on or near the touch panel 431 by using any suitable object or accessory such as a finger or a stylus), and drive a corresponding connection apparatus according to a preset program.

The display unit 440 may be configured to display information input by the user or information provided for the user, and various menus of the in-vehicle terminal. The display unit 440 may include a display panel 441.

The in-vehicle terminal may further include at least one sensor 450, such as an optical sensor, a motion sensor, and other sensors. Specifically, the optical sensor may include an ambient light sensor and a proximity sensor.

The audio circuit 460, a loudspeaker 461, and a microphone 462 may provide audio interfaces between the user and the in-vehicle terminal.

Wi-Fi is a short-range wireless transmission technology. The in-vehicle terminal may help users send and receive an email, browse a webpage, and access streaming media through the Wi-Fi module 370, which provides users with access to the wireless broadband Internet.

The processor 480 is a control center of the in-vehicle terminal, uses various interfaces and lines to connect various parts of the entire in-vehicle terminal, and executes various functions of the in-vehicle terminal and processes data by running or executing software programs and/or modules stored in the memory 420 and invoking data stored in the memory 420.

Steps performed by the terminal device in the foregoing embodiments may be based on the structure of the terminal device shown in FIG. 13.

An embodiment of this disclosure further provides a computer-readable storage medium, storing computer instructions, the computer instructions, when running on a computer, causing the computer to perform the methods according to the foregoing embodiments.

An embodiment of this disclosure further provides a computer program product including instructions, the instructions, when running on a computer, causing the computer to perform the methods according to the foregoing embodiments.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this disclosure, it should be understood that the disclosed system, apparatus, and method may be implemented in other manners. For example, the apparatus embodiments described above are merely exemplary. For example, the division of the units, is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate components may or may not be physically separate, and components displayed as units may or may not be physical units, may be located in one position, or may be distributed on a plurality of network units. Some of or all of the units may be selected according to actual needs to achieve the objectives of the solutions of the embodiments of this disclosure.

In addition, functional units in the embodiments of this disclosure may be integrated into one processing unit, or each of the units may be physically separated, or two or more units may be integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A vehicle positioning method, comprising:
    obtaining, by a satellite positioning device, satellite filtering parameters and satellite data, the satellite filtering parameters comprising a clock skew and a clock skew change rate, the satellite filtering parameters further comprising at least one of location information or speed information corresponding to a vehicle at a first time point, and the satellite data comprising at least one of (i) a pseudo range observation value indicating a distance between the vehicle and a satellite or (ii) a Doppler observation value indicating a Doppler effect of a signal of the satellite, the pseudo range observation value and the Doppler observation value corresponding to the vehicle at the first time point;
    determining a first parameter correction amount corresponding to the vehicle at the first time point according to the satellite filtering parameters and the satellite data;
    updating the satellite filtering parameters by using the first parameter correction amount, to obtain positioning information of the vehicle at the first time point;
    obtaining a motion state of the vehicle at a second time point after the first time point;
    obtaining a constraint matrix of positioning variation information based on a type of the motion state when the motion state of the vehicle at the second time point satisfies a positioning correction condition, the constraint matrix representing a positioning information variation corresponding to the motion state;
    determining a second parameter correction amount corresponding to the vehicle at the second time point according to the constraint matrix corresponding to the motion state; and
    obtaining positioning information of the vehicle at the second time point by modifying the positioning information at the first time point using the second parameter correction amount.

2. The method according to claim 1, wherein the obtaining the satellite filtering parameters and the satellite data comprises:
    transmitting an ephemeris delivery request to a server, causing the server to obtain broadcast ephemeris information corresponding to the first time point in response to the ephemeris delivery request, the broadcast ephemeris information comprising ephemeris parameters corresponding to N satellites, N being an integer greater than or equal to 1;
    receiving the broadcast ephemeris information corresponding to the first time point from the server;
    determining, according to the broadcast ephemeris information corresponding to the first time point, the satellite filtering parameters corresponding to the first time point; and
    obtaining, by the satellite positioning device, the satellite data corresponding to the first time point.

3. The method according to claim 1, wherein
the satellite filtering parameters comprise the location information corresponding to the vehicle at the first time point, and the satellite data comprises the pseudo range observation value corresponding to the vehicle at the first time point; and
the determining the first parameter correction amount comprises:
    obtaining a covariance matrix corresponding to the first time point based on state estimation uncertainties from the satellite filtering parameters;
    obtaining a first Jacobian matrix corresponding to N unit observation vectors based on measurement equations corresponding to state variables, each unit observation vector comprised in the N unit observation vectors representing a direction vector of a connecting line between a corresponding satellite and the vehicle;
    obtaining a pseudo range measurement error matrix corresponding to the first time point based on measurement noise characteristics of the satellite positioning device;
    obtaining a first gain matrix corresponding to the first time point;
    determining a first prediction residual vector according to the satellite filtering parameters and the pseudo range observation value corresponding to the first time point; and
    determining the first parameter correction amount corresponding to the vehicle at the first time point according to the covariance matrix corresponding to the first time point, the first Jacobian matrix, the pseudo range measurement error matrix, the first gain matrix, and the first prediction residual vector.

4. The method according to claim 1, wherein
the satellite filtering parameters comprise the speed information corresponding to the vehicle at the first time point, and the satellite data comprises the Doppler observation value corresponding to the vehicle at the first time point; and
the determining the first parameter correction amount comprises:
    obtaining a covariance matrix corresponding to the first time point based on state estimation uncertainties from the satellite filtering parameters;
    obtaining a second Jacobian matrix corresponding to N unit observation vectors by calculating partial derivatives of Doppler measurements corresponding to state variables, each unit observation vector comprised in the N unit observation vectors representing a direction vector of a connecting line between a corresponding satellite and the vehicle;
    obtaining a Doppler measurement error matrix corresponding to the first time point based on measurement noise characteristics of the satellite positioning device;
    obtaining a second gain matrix corresponding to the first time point;

determining a second prediction residual vector according to the satellite filtering parameters and the Doppler observation value corresponding to the first time point; and determining the first parameter correction amount corresponding to the vehicle at the first time point according to the covariance matrix corresponding to the first time point, the second Jacobian matrix, the Doppler measurement error matrix, the second gain matrix, and the second prediction residual vector.

5. The method according to claim 1, wherein the satellite filtering parameters comprise the speed information and the location information corresponding to the vehicle at the first time point, and the satellite data comprises the pseudo range observation value and the Doppler observation value corresponding to the vehicle at the first time point; and the determining the first parameter correction amount comprises:

obtaining a covariance matrix corresponding to the first time point based on state estimation uncertainties from the satellite filtering parameters;

obtaining a first Jacobian matrix corresponding to N unit observation vectors by calculating partial derivatives of measurement equations corresponding to state variables, each unit observation vector comprised in the N unit observation vectors representing a direction vector of a connecting line between a corresponding satellite and the vehicle;

obtaining a pseudo range measurement error matrix corresponding to the first time point based on measurement noise characteristics of the satellite positioning device;

obtaining a first gain matrix corresponding to the first time point;

determining a first prediction residual vector according to the satellite filtering parameters and the pseudo range observation value corresponding to the first time point;

determining a target parameter correction amount corresponding to the vehicle at the first time point according to the covariance matrix corresponding to the first time point, the first Jacobian matrix, the pseudo range measurement error matrix, the first gain matrix, and the first prediction residual vector, the target parameter correction amount being used for updating the satellite filtering parameters;

determining a target covariance matrix according to the covariance matrix corresponding to the first time point, the first gain matrix, and the first Jacobian matrix; and determining the first parameter correction amount corresponding to the vehicle at the first time point according to the target covariance matrix.

6. The method according to claim 5, wherein the determining the first parameter correction amount corresponding to the vehicle at the first time point according to the target covariance matrix comprises:

obtaining a second Jacobian matrix corresponding to the N unit observation vectors by calculating partial derivatives of Doppler measurements corresponding to the state variables;

obtaining a Doppler measurement error matrix corresponding to the first time point based on the measurement noise characteristics of the satellite positioning device;

obtaining a second gain matrix corresponding to the first time point;

determining a second prediction residual vector according to the satellite filtering parameters and the Doppler observation value corresponding to the first time point; and determining the first parameter correction amount corresponding to the vehicle at the first time point according to the target covariance matrix, the second Jacobian matrix, the Doppler measurement error matrix, the second gain matrix, and the second prediction residual vector; and the updating the satellite filtering parameters comprises:

determining updated satellite filtering parameters according to the target parameter correction amount and the satellite filtering parameters, the updated satellite filtering parameters comprising updated speed information and updated location information corresponding to the vehicle at the first time point; and obtaining the positioning information of the vehicle at the first time point by modifying the updated satellite filtering parameters using the first parameter correction amount.

7. The method according to claim 1, wherein the updating the positioning information at the first time point by using the second parameter correction amount, to obtain the positioning information of the vehicle at the second time point comprises:

updating the positioning information at the first time point by using the second parameter correction amount, to obtain to-be-processed positioning information;

determining first positioning information according to the positioning information at the first time point and a first weight value;

determining second positioning information according to the to-be-processed positioning information and a second weight value; and determining the positioning information of the vehicle at the second time point according to the first positioning information and the second positioning information.

8. The method according to claim 1, wherein the satellite filtering parameters comprise the location information and the speed information corresponding to the vehicle at the first time point; and before the obtaining the motion state of the vehicle at the second time point, the method further comprises:

obtaining a location confidence factor and a speed confidence factor based on measurement accuracies determined from the location information and the speed information corresponding to the satellite filtering parameters, the location confidence factor representing location accuracy of the vehicle, and the speed confidence factor representing speed accuracy of the vehicle;

obtaining a number of visible satellites; and determining to execute the obtaining the motion state of the vehicle at a second moment in a case that the location confidence factor, the speed confidence factor and the number of visible satellites satisfy a vehicle constraint condition.

9. The method according to claim 1, wherein the obtaining the motion state of the vehicle at the second time point comprises:

obtaining, by an image acquisition apparatus, a first in-vehicle image;

obtaining, by the image acquisition apparatus, a second in-vehicle image after obtaining the first in-vehicle image;

performing feature point matching on the first in-vehicle image and the second in-vehicle image; and determining the motion state of the vehicle at the second time point according to a feature point matching result.

10. The method according to claim 1, wherein the obtaining the motion state of the vehicle at the second time point comprises:

determining the motion state of the vehicle at the second time point according to steering wheel position information corresponding to the vehicle; or, determining the motion state of the vehicle at the second time point based on a road network matching result.

11. The method according to claim 1, wherein:

the method further comprises, after the obtaining the motion state of the vehicle at the second time point, determining that the motion state of the vehicle at the second time point satisfies the positioning correction condition when the motion state of the vehicle at the second time point is a stationary state;

the obtaining the constraint matrix corresponding to the motion state comprises:

constructing the constraint matrix corresponding to the stationary state based on zero velocity constraints; and the determining the second parameter correction amount comprises:

obtaining a covariance matrix corresponding to the second time point based on state estimation uncertainties from the stationary state;

obtaining a first measurement error variance matrix based on measurement uncertainties for the zero velocity constraints;

obtaining a speed matrix corresponding to the second time point;

obtaining a third gain matrix corresponding to the second time point; and determining the second parameter correction amount corresponding to the vehicle at the second time point according to the covariance matrix corresponding to the second time point, the constraint matrix corresponding to the stationary state, the first measurement error variance matrix, the speed matrix corresponding to the second time point, and the third gain matrix.

12. The method according to claim 1, wherein:

the method further comprises, after the obtaining the motion state of the vehicle at the second time point, determining that the motion state of the vehicle at the second time point satisfies the positioning correction condition when the motion state of the vehicle at the second time point is a driving straight state;

the obtaining the constraint matrix corresponding to the motion state comprises:

constructing the constraint matrix corresponding to the driving straight state; and the determining the second parameter correction amount comprises:

obtaining a covariance matrix corresponding to the second time point based on state estimation uncertainties from the driving straight state;

obtaining a second measurement error variance matrix based on measurement uncertainties for constant heading constraints;

obtaining a motion direction difference, the motion direction difference being a difference between a motion direction of the vehicle at the second time point and a motion direction of the vehicle at a third time point before the second time point;

obtaining a fourth gain matrix corresponding to the second time point; and determining the second parameter correction amount corresponding to the vehicle at the second time point according to the covariance matrix corresponding to the second time point, the constraint matrix corresponding to the driving straight state, the second measurement error variance matrix, the motion direction difference, and the fourth gain matrix.

13. A vehicle positioning apparatus, comprising:

processing circuitry configured to obtain, by a satellite positioning device, satellite filtering parameters and satellite data, the satellite filtering parameters comprising a clock skew and a clock skew change rate, the satellite filtering parameters further comprising at least one of location information or speed information corresponding to a vehicle at a first time point, and the satellite data comprising at least one of (i) a pseudo range observation value indicating a distance between the vehicle and a satellite or (ii) a Doppler observation value indicating a Doppler effect of a signal of the satellite, the pseudo range observation value and the Doppler observation value corresponding to the vehicle at the first time point;

determine a first parameter correction amount corresponding to the vehicle at the first time point according to the satellite filtering parameters and the satellite data;

update the satellite filtering parameters by using the first parameter correction amount, to obtain positioning information of the vehicle at the first time point;

obtain a motion state of the vehicle at a second time point after the first time point;

obtain a constraint matrix of positioning variation information based on a type of the motion state when the motion state of the vehicle at the second time point satisfies a positioning correction condition, the constraint matrix representing a positioning information variation corresponding to the motion state;

determine a second parameter correction amount corresponding to the vehicle at the second time point according to the constraint matrix corresponding to the motion state; and obtain positioning information of the vehicle at the second time point by modifying the positioning information at the first time point using the second parameter correction amount.

14. The apparatus according to claim 13, wherein the processing circuitry is further configured to:

transmit an ephemeris delivery request to a server, causing the server to obtain broadcast ephemeris information corresponding to the first time point in response to the ephemeris delivery request, the broadcast ephemeris information comprising ephemeris parameters corresponding to N satellites, N being an integer greater than or equal to 1;

receive the broadcast ephemeris information corresponding to the first time point from the server;

determine, according to the broadcast ephemeris information corresponding to the first time point, the satellite filtering parameters corresponding to the first time point; and obtain, by the satellite positioning device, the satellite data corresponding to the first time point.

15. The apparatus according to claim 13, wherein
the satellite filtering parameters comprise the location information corresponding to the vehicle at the first time point, and the satellite data comprises the pseudo range observation value corresponding to the vehicle at the first time point; and
the processing circuitry is further configured to:
   obtain a covariance matrix corresponding to the first time point based on state estimation uncertainties from the satellite filtering parameters;
   obtain a first Jacobian matrix corresponding to N unit observation vectors based on measurement equations corresponding to state variables, each unit observation vector comprised in the N unit observation vectors representing a direction vector of a connecting line between a corresponding satellite and the vehicle;
   obtain a pseudo range measurement error matrix corresponding to the first time point based on measurement noise characteristics of the satellite positioning device;
   obtain a first gain matrix corresponding to the first time point;
   determine a first prediction residual vector according to the satellite filtering parameters and the pseudo range observation value corresponding to the first time point; and
   determine the first parameter correction amount corresponding to the vehicle at the first time point according to the covariance matrix corresponding to the first time point, the first Jacobian matrix, the pseudo range measurement error matrix, the first gain matrix, and the first prediction residual vector.

16. The apparatus according to claim 13, wherein
the satellite filtering parameters comprise the speed information corresponding to the vehicle at the first time point, and the satellite data comprises the Doppler observation value corresponding to the vehicle at the first time point; and
the processing circuitry is further configured to:
   obtain a covariance matrix corresponding to the first time point based on state estimation uncertainties from the satellite filtering parameters;
   obtain a second Jacobian matrix corresponding to N unit observation vectors by calculating partial derivatives of Doppler measurements corresponding to state variables, each unit observation vector comprised in the N unit observation vectors representing a direction vector of a connecting line between a corresponding satellite and the vehicle;
   obtain a Doppler measurement error matrix corresponding to the first time point based on measurement noise characteristics of the satellite positioning device;
   obtain a second gain matrix corresponding to the first time point;
   determine a second prediction residual vector according to the satellite filtering parameters and the Doppler observation value corresponding to the first time point; and
   determine the first parameter correction amount corresponding to the vehicle at the first time point according to the covariance matrix corresponding to the first time point, the second Jacobian matrix, the Doppler measurement error matrix, the second gain matrix, and the second prediction residual vector.

17. The apparatus according to claim 13, wherein
the satellite filtering parameters comprise the speed information and the location information corresponding to the vehicle at the first time point, and the satellite data comprises the pseudo range observation value and the Doppler observation value corresponding to the vehicle at the first time point; and
the processing circuitry is further configured to:
   obtain a covariance matrix corresponding to the first time point based on state estimation uncertainties from the satellite filtering parameters;
   obtain a first Jacobian matrix corresponding to N unit observation vectors by calculating partial derivatives of measurement equations corresponding to state variables, each unit observation vector comprised in the N unit observation vectors representing a direction vector of a connecting line between a corresponding satellite and the vehicle;
   obtain a pseudo range measurement error matrix corresponding to the first time point based on measurement noise characteristics of the satellite positioning device;
   obtain a first gain matrix corresponding to the first time point;
   determine a first prediction residual vector according to the satellite filtering parameters and the pseudo range observation value corresponding to the first time point;
   determine a target parameter correction amount corresponding to the vehicle at the first time point according to the covariance matrix corresponding to the first time point, the first Jacobian matrix, the pseudo range measurement error matrix, the first gain matrix, and the first prediction residual vector, the target parameter correction amount being used for updating the satellite filtering parameters;
   determine a target covariance matrix according to the covariance matrix corresponding to the first time point, the first gain matrix, and the first Jacobian matrix; and
   determine the first parameter correction amount corresponding to the vehicle at the first time point according to the target covariance matrix.

18. The apparatus according to claim 17, wherein
the processing circuitry is further configured to:
   obtain a second Jacobian matrix corresponding to the N unit observation vectors by calculating partial derivatives of Doppler measurements corresponding to the state variables;
   obtain a Doppler measurement error matrix corresponding to the first time point based on the measurement noise characteristics of the satellite positioning device;
   obtain a second gain matrix corresponding to the first time point;
   determine a second prediction residual vector according to the satellite filtering parameters and the Doppler observation value corresponding to the first time point;
   determine the first parameter correction amount corresponding to the vehicle at the first time point according to the target covariance matrix, the second Jacobian matrix, the Doppler measurement error matrix, the second gain matrix, and the second prediction residual vector;

determine updated satellite filtering parameters according to the target parameter correction amount and the satellite filtering parameters, the updated satellite filtering parameters comprising updated speed information and updated location information corresponding to the vehicle at the first time point; and obtain the positioning information of the vehicle at the first time point by modifying the updated satellite filtering parameters using the first parameter correction amount.

19. The apparatus according to claim 13, wherein the processing circuitry is further configured to:

update the positioning information at the first time point by using the second parameter correction amount, to obtain to-be-processed positioning information;

determine first positioning information according to the positioning information at the first time point and a first weight value;

determine second positioning information according to the to-be-processed positioning information and a second weight value; and determining the positioning information of the vehicle at the second time point according to the first positioning information and the second positioning information.

20. A non-transitory computer-readable storage medium storing computer-readable instructions thereon, which, when executed by a computer device, cause the computer device to perform a vehicle positioning method comprising:

obtaining, by a satellite positioning device, satellite filtering parameters and satellite data, the satellite filtering parameters comprising a clock skew and a clock skew change rate, the satellite filtering parameters further comprising at least one of location information or speed information corresponding to a vehicle at a first time point, and the satellite data comprising at least one of (i) a pseudo range observation value indicating a distance between the vehicle and a satellite or (ii) a Doppler observation value indicating a Doppler effect of a signal of the satellite, the pseudo range observation value and the Doppler observation value corresponding to the vehicle at the first time point;

determining a first parameter correction amount corresponding to the vehicle at the first time point according to the satellite filtering parameters and the satellite data;

updating the satellite filtering parameters by using the first parameter correction amount, to obtain positioning information of the vehicle at the first time point;

obtaining a motion state of the vehicle at a second time point after the first time point;

obtaining a constraint matrix of positioning variation information based on a type of the motion state when the motion state of the vehicle at the second time point satisfies a positioning correction condition, the constraint matrix representing a positioning information variation corresponding to the motion state;

determining a second parameter correction amount corresponding to the vehicle at the second time point according to the constraint matrix corresponding to the motion state; and obtaining positioning information of the vehicle at the second time point by modifying the positioning information at the first time point using the second parameter correction amount.

\* \* \* \* \*